US012292706B2

(12) United States Patent
Shingu et al.

(10) Patent No.: US 12,292,706 B2
(45) Date of Patent: May 6, 2025

(54) IMAGE FORMING APPARATUS AND IMAGE FORMING METHOD

(71) Applicant: FUJIFILM Business Innovation Corp., Tokyo (JP)

(72) Inventors: Kenta Shingu, Kanagawa (JP); Yoshiteru Yamada, Kanagawa (JP); Yuka Kawamoto, Kanagawa (JP); Daisuke Tano, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/435,704

(22) Filed: Feb. 7, 2024

(65) Prior Publication Data

US 2025/0044724 A1 Feb. 6, 2025

(30) Foreign Application Priority Data

Aug. 4, 2023 (JP) ................................ 2023-128181

(51) Int. Cl.
*G03G 15/16* (2006.01)

(52) U.S. Cl.
CPC ......... *G03G 15/161* (2013.01); *G03G 15/162* (2013.01); *G03G 2215/1661* (2013.01)

(58) Field of Classification Search
CPC ............... G03G 15/161; G03G 15/162; G03G 2215/1661
See application file for complete search history.

(56) References Cited

U.S. PATENT DOCUMENTS

2020/0310282 A1* 10/2020 Sugiyama .......... G03G 15/0818
2025/0053109 A1* 2/2025 Yamada ............. G03G 21/0011

FOREIGN PATENT DOCUMENTS

JP 2001-051565 A 2/2001

* cited by examiner

*Primary Examiner* — Stephanie E Bloss
*Assistant Examiner* — Michael A Harrison
(74) *Attorney, Agent, or Firm* — Oliff PLC

(57) ABSTRACT

An image forming apparatus includes an image holder; a charging unit that charges a surface of the image holder; an electrostatic charge image forming unit that forms an electrostatic charge image on the charged surface of the image holder; a developing unit that accommodates an electrostatic charge image developer containing a toner having toner particles and that develops an electrostatic charge image formed on the surface of the image holder as a toner image by the electrostatic charge image developer, in which a release agent present in a region within 800 nm from a surface of the toner particles is 70% or more of a release agent in entire toner particles and a melting temperature of the release agent is 65° C. or higher and 80° C. or lower; a transfer unit that has a transfer opposing belt which comes into contact with a surface of the recording medium on an opposite side to a surface to which the toner image is transferred and that transfers the toner image formed on the surface of the image holder to the surface of the recording medium; and a cleaning device having a cleaning blade that is brought into contact with and cleans an outer peripheral surface of the transfer opposing belt, that is constituted of a polyurethane resin, and that has an indentation elastic modulus of 15 MPa or more and 35 MPa or less on a surface which is brought into contact with the transfer opposing belt, in which a total amount of F and Si present within 200 nm from the surface which is brought into contact with the transfer opposing belt accounts for 75% or more of a total amount of F and Si present within 5 μm from the surface.

14 Claims, 3 Drawing Sheets

IMAGE FORMING APPARATUS AND IMAGE FORMING METHOD

CROSS-REFERENCE TO RELATED APPLICATIONS

This application is based on and claims priority under 35 USC 119 from Japanese Patent Application No. 2023-128181 filed Aug. 4, 2023.

BACKGROUND

(i) Technical Field

The present disclosure relates to an image forming apparatus and an image forming method.

(ii) Related Art

In an image forming apparatus (such as a copy machine, a facsimile machine, or a printer) using an electrophotographic method, a toner image formed on the surface of an image holder is transferred to the surface of a recording medium and fixed on the recording medium such that an image is formed. There is an image forming apparatus in which in the case of transferring such a toner image to a recording medium, from the viewpoint of improving transferability, for example, a transfer opposing belt which comes into contact with a surface opposite to a surface to which the toner image of the recording medium is transferred is disposed. A cleaning blade is used to clean the outer peripheral surface of the transfer opposing belt.

For example, in JP2001-051565A "a cleaning blade formed by cutting a plate-shaped body made of a cured body of a polyurethane resin composition, in which a silicon atom (Si) is present in an amount of 4 atom % or more by adhesion of an organic siloxane and an oxygenation treatment to an end surface of the cleaning blade formed by the cutting." is disclosed.

SUMMARY

Aspects of non-limiting embodiments of the present disclosure relate to an image forming apparatus and an image forming method, in which the occurrence of toner filming on the surface of the transfer opposing belt is suppressed and wear in the cleaning blade is suppressed, compared to an image forming apparatus and an image forming method, in which a cleaning blade having indentation elastic modulus of more than 35 MPa on a surface which is brought into contact with the transfer opposing belt, or a cleaning blade where the total amount of F and Si present within 200 nm from a surface which is brought into contact with the transfer opposing belt is less than 75% with respect to the total amount of F and Si present within 5 μm from the surface is provided.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

Means for addressing the above object include the following aspect.

According to an aspect of the present disclosure, there is provided an image forming apparatus including, an image holder, a charging unit that charges a surface of the image holder, an electrostatic charge image forming unit that forms an electrostatic charge image on the charged surface of the image holder, a developing unit that accommodates an electrostatic charge image developer containing a toner having toner particles and that develops an electrostatic charge image formed on the surface of the image holder as a toner image by the electrostatic charge image developer, in which a release agent present in a region within 800 nm from a surface of the toner particles is 70% or more of a release agent in entire toner particles and a melting temperature of the release agent is 65° C. or higher and 80° C. or lower, a transfer unit that has a transfer opposing belt which comes into contact with a surface of a recording medium on an opposite side to a surface to which the toner image is transferred and that transfers the toner image formed on the surface of the image holder to the surface of the recording medium, and a cleaning device having a cleaning blade that is brought into contact with and cleans an outer peripheral surface of the transfer opposing belt, that is constituted of a polyurethane resin, and that has an indentation elastic modulus of 15 MPa or more and 35 MPa or less on a surface which is brought into contact with the transfer opposing belt, in which a total amount of F and Si present within 200 nm from the surface which is brought into contact with the transfer opposing belt accounts for 75% or more of a total amount of F and Si present within 5 m from the surface.

BRIEF DESCRIPTION OF THE DRAWINGS

Exemplary embodiment(s) of the present invention will be described in detail based on the following figures, wherein.

DETAILED DESCRIPTION

Figure 1:
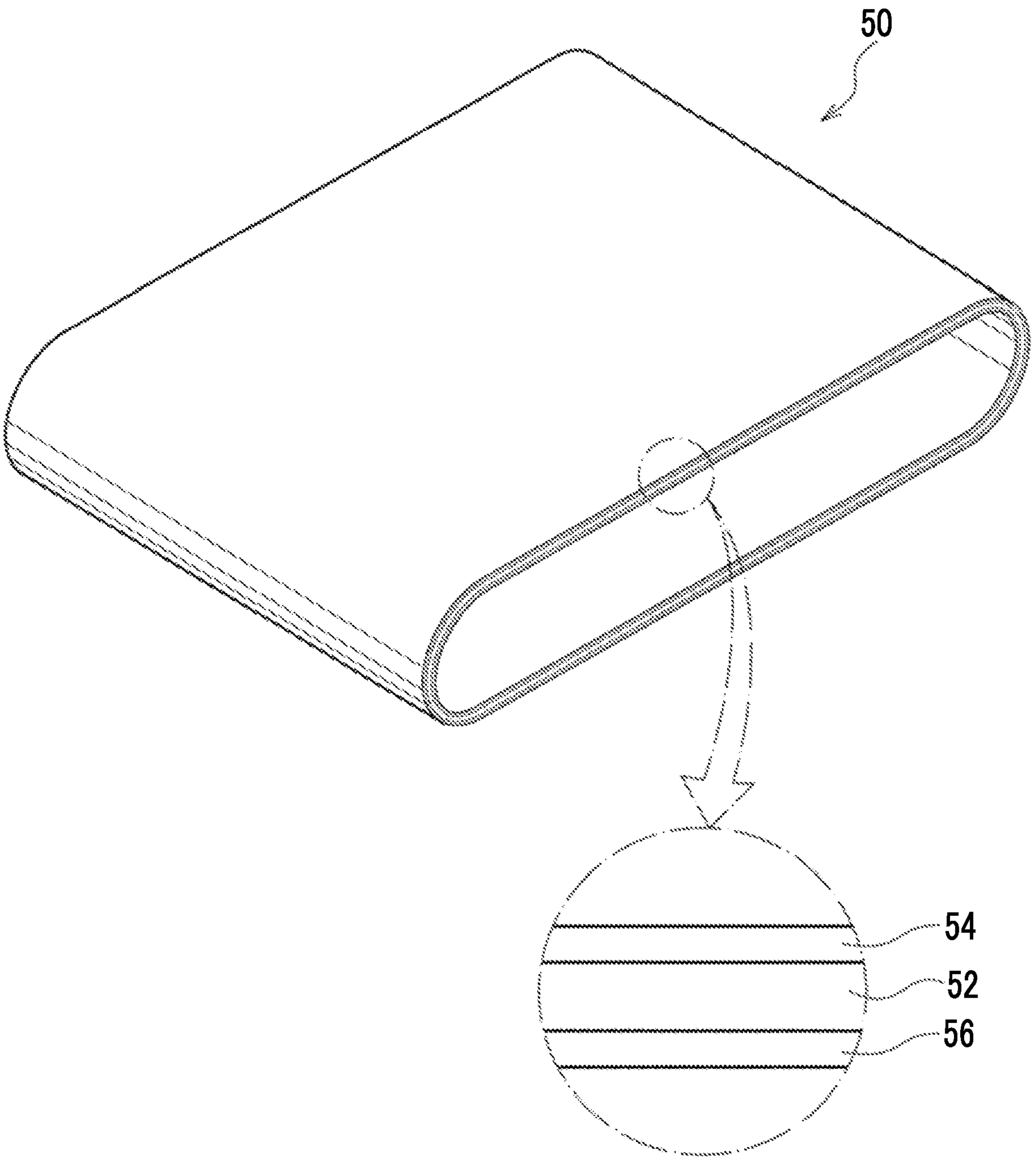
FIG. 1 is a schematic configuration view showing an example of a transfer opposing belt used in the present exemplary embodiment.

Hereinafter, the present exemplary embodiment as an example of the present disclosure will be described. The description and examples of these exemplary embodiments illustrate the exemplary embodiments and do not limit the scopes of the exemplary embodiments.

Regarding the ranges of numerical values described in stages in the present exemplary embodiment, the upper limit value or lower limit value of a range of numerical values may be replaced with the upper limit or lower limit of another range of numerical values described in stages. In addition, regarding the ranges of numerical values described in the present exemplary embodiment, the upper limit value or lower limit value of a range of numerical values may be replaced with values described in examples.

In the present exemplary embodiment, the term "step" includes not only an independent step but also a step that cannot be clearly distinguished from other steps but can achieve the expected object thereof.

In the present exemplary embodiment, in a case where an exemplary embodiment is described with reference to drawings, the configuration of the exemplary embodiment is not limited to the configuration shown in the drawings. In addition, the sizes of members in each drawing are conceptual, and a relative relationship between the sizes of the members is not limited thereto.

In the present exemplary embodiment, each component may include two or more kinds of corresponding substances. In a case where the amount of each component in a composition is mentioned in the present exemplary embodiment, and there are two or more kinds of substances corresponding to each component in the composition, unless otherwise specified, the amount of each component means the total amount of two or more kinds of the substances present in the composition.

Image Forming Apparatus

The image forming apparatus according to the present exemplary embodiment includes an image holder, a charging unit that charges the surface of the image holder, an electrostatic charge image forming unit that forms an electrostatic charge image on the charged surface of the image holder, a developing unit that accommodates an electrostatic charge image developer containing a toner having toner particles and that develops the electrostatic charge image formed on the surface of the image holder as a toner image by the electrostatic charge image developer, a transfer unit that has a transfer opposing belt which comes into contact with a surface of the recording medium on an opposite side (hereinafter, simply referred to as "back surface") to a surface to which the toner image is transferred and that transfers the toner image formed on the surface of the image holder to the surface of the recording medium, and a cleaning device having a cleaning blade that is brought into contact with and cleans an outer peripheral surface of the transfer opposing belt.

In the toner particles, the release agent present in a region within 800 nm from a surface of the toner particles is 70% or more of the release agent in the entire toner particles and a melting temperature of the release agent is 65° C. or higher and 80° C. or lower.

The cleaning blade is constituted of a polyurethane resin and has an indentation elastic modulus of 15 MPa or more and 35 MPa or less on a surface which is brought into contact with the transfer opposing belt. In addition, the total amount of F and Si present within 200 nm from the surface which is brought into contact with the transfer opposing belt accounts for 75% or more of a total amount of F and Si present within 5 μm from the surface.

With the above configuration, in the image forming apparatus according to the present exemplary embodiment, the occurrence of toner filming on the surface of the transfer opposing belt is suppressed and wear in the cleaning blade is suppressed. The reason is presumed as follows.

In a transfer portion of a toner image to a recording medium in an image forming apparatus, vibration is often generated by an influence such as passage of the recording medium. In a case where a cleaning device that brings the cleaning blade into contact with and cleans the outer peripheral surface of the transfer opposing belt is further provided to the transfer unit having a transfer opposing belt that is in contact with the back surface of the recording medium, the load instantaneously applied to the cleaning blade by the influence of the vibration increases, the pressing of the cleaning blade against the transfer opposing belt is not stable, and the cleaning performance is not stable.

Therefore, in order to improve the robustness against vibration (that is, the property of being less likely to be affected by an external factor such as vibration) in the cleaning device for the transfer opposing belt, a method of providing a load adjusting mechanism for the cleaning blade is considered. That is, a method of controlling a load applied to the transfer opposing belt from the cleaning blade by a load adjusting mechanism to keep the cleaning blade pressing against the transfer opposing belt at a stable pressure and to stabilize the cleaning performance can be considered.

However, in a case where the load adjusting mechanism is provided, the control mechanism in the image forming apparatus becomes complicated, which causes an increase in cost. Therefore, realization of stable cleaning performance for the transfer opposing belt without providing the load adjusting mechanism is required.

In addition, from the viewpoint of suppressing energy consumption, there is demand for a toner image having excellent low-temperature fixability. Therefore, from the viewpoint of improving the low-temperature fixability of an image, it has been studied to use a toner having toner particles in which wax having a low melting temperature is unevenly distributed on a surface layer, specifically, a toner in which a release agent present in a region within 800 nm from a surface of the toner particles is 70% or more of the release agent in the entire toner particles and a melting temperature of the release agent is 65° C. or higher and 80° C. or lower. However, in a case where toner particles in which wax having a low melting temperature is unevenly distributed on the surface layer is used, toner filming may easily occur on the surface of the transfer opposing belt. This is considered to be because the surface of the toner particles in which the wax having a low melting temperature as described above has been unevenly distributed on the surface layer tends to be soft and is easily crushed by the pressure from the cleaning blade.

From the above viewpoint, in an image forming apparatus having the cleaning device that uses toner particles in which wax having a low melting temperature as described above is unevenly distributed on a surface layer and that cleans the surface of a transfer opposing belt with a cleaning blade, even without providing the load adjusting mechanism in the cleaning device, suppression of the occurrence of toner filming on the surface of the transfer opposing belt is required.

A method of improving the scraping property by increasing the pressing force of the cleaning blade pressed against the transfer opposing belt, to suppress toner filming is considered. However, in a case where the pressing force is increased, the cleaning blade is worn more severely, and the life of the cleaning blade is shortened. Therefore, in addition to suppressing toner filming, suppression of the wear of the cleaning blade is also required.

On the other hand, in the image forming apparatus according to the present exemplary embodiment, the cleaning blade in which the total amount of F and Si present within 200 nm from the surface which is brought into contact with the transfer opposing belt accounts for 75% or more of the total amount of F and Si present within 5 μm from the surface is used. That is, F and Si are unevenly distributed in the vicinity of the contact portion with the transfer opposing belt in the cleaning blade. In a case where at least one of F or Si is present in the contact portion, the friction of the cleaning blade is reduced, and the wear of the cleaning blade is suppressed. In addition, even in a case where the load applied to the cleaning blade is instantaneously increased according to the vibration, since the friction of the cleaning blade is reduced, the behavior at the tip of the contact portion is stabilized. As a result, stable cleaning performance is exhibited.

Furthermore, in the present exemplary embodiment, a cleaning blade having an indentation elastic modulus of 35 MPa or less on a surface which is brought into contact with the transfer opposing belt is used, that is, a surface pressure applied to the transfer opposing belt by the cleaning blade is reduced. Accordingly, even in the case of using the toner particles in which the wax having a low melting temperature as described above is unevenly distributed on the surface layer, the occurrence of toner filming on the surface of the transfer opposing belt is suppressed.

From the above, according to the image forming apparatus according to the present exemplary embodiment, it is presumed that the occurrence of toner filming on the surface of the transfer opposing belt is suppressed and the wear in the cleaning blade is suppressed.

Toner

The toner contained in the electrostatic charge image developer used in the image forming apparatus according to the present exemplary embodiment will be described. The toner contains toner particles, and in the toner particles, the release agent present in a region within 800 nm from a surface of the toner particles is 70% or more of the release agent in the entire toner particles and a melting temperature of the release agent is 65° C. or higher and 80° C. or lower.

The toner particles contain a release agent and may further contain a binder resin. In addition, the toner particles may contain other internal additives such as a colorant.

Release Agent

The melting temperature of the release agent is 65° C. or higher and 80° C. or lower, for example, preferably 68° C. or higher and 77° C. or lower, more preferably 70° C. or higher and 75° C. or lower. In a case where the melting temperature of the release agent is 80° C. or lower, the low-temperature fixability of the image can be improved. On the other hand, in a case where the melting temperature of the release agent is 65° C. or higher, the occurrence of toner filming on the surface of the transfer belt is suppressed.

The melting temperature of the release agent is determined from a DSC curve obtained by differential scanning calorimetry (DSC) by "peak melting temperature" described in the method for determining the melting temperature in JIS K-7121-1987, "Testing methods for transition temperatures of plastics".

As for the release agent, 70% or more of the all release agents is present within 800 nm from the surface of the toner particles (hereinafter, the abundance ratio of the release agent present within 800 nm from the surface of the toner particles is referred to as "surface layer ratio of release agent").

The surface layer ratio of the release agent is 70% or more, for example, preferably 75% or more, and more preferably 80% or more. The upper limit value of the surface layer ratio of the release agent is, for example, preferably 100%. In a case where the surface layer ratio of the release agent is 70% or more, the low-temperature fixability of the image may be improved.

Here, a method of measuring the surface layer ratio of the release agent will be described.

Samples and images for measurement are prepared by the following methods.

The toner is mixed with and embedded in an epoxy resin, and the epoxy resin is solidified. The obtained solidified substance is cut with an ultramicrotome device (UltracutUCT manufactured by Leica Microsystems), thereby producing a thin sample having a thickness of 80 nm or more and 130 nm or less. By using an ultra-high resolution field emission scanning electron microscope (FE-SEM, S-4800 manufactured by Hitachi High-Tech Corporation.), an SEM image of the thin sample is obtained. In the SEM image, a toner particle cross section in which the maximum length of 85% or more of the volume-average particle size of the toner particles is selected, the domain of the release agent is observed, the area of the release agent of the entire toner particles and the area of the release agent present in the region within 800 nm from the surface of the toner particles are determined, and the ratio of the two areas (the area of the release agent present in the region within 800 nm from the surface of the toner particles/the area of the release agent of the entire toner particles) is calculated. Then, this calculation is performed for 100 toner particles, and an average value thereof is defined as the surface layer ratio of the release agent.

The reason for selecting toner particle cross sections in which the maximum length is 85% or more of the volume-average particle size of the toner particles is that cross sections in which the maximum length is less than 85% of the volume-average particle size are expected to be cross sections of the end portions of the toner particles, and thus the state of the domain in the toner particles is not sufficiently reflected on the cross section of the end portions of the toner particles.

Examples of the control method for setting the surface layer ratio of the release agent to 70% or more include a method in which toner particles have a core/shell structure and a release agent is used when forming a shell.

Examples of the release agent include hydrocarbon-based wax such as paraffin wax; natural wax such as carnauba wax, rice wax, and candelilla wax; synthetic or mineral/petroleum-based wax such as montan wax; ester-based wax such as fatty acid esters and montanic acid esters; and the like. The release agent is not limited to the agents.

As the release agent, for example, a hydrocarbon-based wax is preferably used. The hydrocarbon-based wax is a wax having a hydrocarbon as a skeleton, and examples thereof include Fischer-Tropsch wax, a polyethylene-based wax (a wax having a polyethylene skeleton), a polypropylene-based wax (a wax having a polypropylene skeleton), a paraffin-based wax (a wax having a paraffin skeleton), a microcrystalline wax, and the like. Among these, from the viewpoint of fixability, for example, the hydrocarbon-based wax may be Fischer-Tropsch wax, a polyethylene wax, or polypropylene wax. In addition, from the viewpoint of fixability, for example, a plurality of types of hydrocarbon-based waxes are preferably contained in the toner particles.

The ratio of the hydrocarbon-based wax to the all release agents may be, for example, 85% by mass or more, and is preferably 95% by mass or more and more preferably 100% by mass.

The content of the release agent is, for example, preferably 1% by mass or more and 20% by mass or less, more preferably 3% by mass or more and 20% by mass or less, even more preferably 3% by mass or more and 15% by mass or less, and even still more preferably 5% by mass or more and 15% by mass or less with respect to the entire toner particles.

Binder Resin

As the binder resin, for example, a polyester resin is preferably used. The ratio of the polyester resin to the all binder resins may be, for example, 75% by mass or more, and is preferably 90% by mass or more and more preferably 100% by mass.

Examples of the polyester resin include known amorphous polyester resins. As the polyester resin, a crystalline polyester resin may be used in combination with an amorphous polyester resin. Provided that the content of the crystalline polyester resin may be, for example, in a range of 2% by mass or more and 40% by mass or less (for example, preferably 2% by mass or more and 20% by mass or less) with respect to the all binder resins.

The "crystallinity" of a resin indicates that a clear endothermic peak is present in differential scanning calorimetry (DSC) rather than a stepwise change in endothermic amount and specifically indicates that the half-width of the endothermic peak in a case of measurement at a temperature rising rate of 10 (° C./min) is within 10° C.

On the other hand, the "amorphous" resin indicates that the half-width is more than 10° C., a stepwise change in endothermic amount is shown, or a clear endothermic peak is not recognized.

Amorphous Polyester Resin

Examples of the amorphous polyester resin include a polycondensate of a polyvalent carboxylic acid and a polyhydric alcohol. As the amorphous polyester resin, a commercially available product or a synthetic resin may be used.

Examples of the polyvalent carboxylic acid include aliphatic dicarboxylic acids (for example, oxalic acid, malonic acid, maleic acid, fumaric acid, citraconic acid, itaconic acid, glutaconic acid, succinic acid, alkenyl succinic acid, adipic acid, sebacic acid, and the like), alicyclic dicarboxylic acid (for example, cyclohexanedicarboxylic acid and the like), aromatic dicarboxylic acids (for example, terephthalic acid, isophthalic acid, phthalic acid, naphthalenedicarboxylic acid, and the like), anhydrides of these, and lower alkyl esters of these (for example, having 1 or more and 5 or less carbon atoms). Among these, for example, aromatic dicarboxylic acids are preferable as the polyvalent carboxylic acid.

As the polyvalent carboxylic acid, a carboxylic acid having a valency of 3 or more that has a crosslinked structure or a branched structure may be used in combination with a dicarboxylic acid. Examples of the carboxylic acid having a valency of 3 or more include trimellitic acid, pyromellitic acid, an anhydride of these, a lower alkyl ester of these (for example, having 1 or more and 5 or less carbon atoms) thereof.

One kind of polyvalent carboxylic acid may be used alone, or two or more kinds of polyvalent carboxylic acids may be used in combination.

Examples of the polyhydric alcohol include an aliphatic diol (for example, ethylene glycol, diethylene glycol, triethylene glycol, propylene glycol, butanediol, hexanediol, or neopentyl glycol), an alicyclic diol (for example, cyclohexanediol, cyclohexanedimethanol, or hydrogenated bisphenol A), and an aromatic diol (for example, an ethylene oxide adduct of bisphenol A or a propylene oxide adduct of bisphenol A). Among these, as the polyhydric alcohol, for example, an aromatic diol or an alicyclic diol is preferable, and an aromatic diol is more preferable.

As the polyhydric alcohol, a polyhydric alcohol having a valency of 3 or more that has a crosslinked structure or a branched structure may be used in combination with a diol. Examples of the polyhydric alcohol having a valency of 3 or more include glycerin, trimethylolpropane, and pentaerythritol.

The polyhydric alcohol may be used alone or in combination of two or more kinds.

The glass transition temperature (Tg) of the amorphous polyester resin is, for example, preferably 50° C. or higher and 80° C. or lower, and more preferably 50° C. or higher and 65° C. or lower.

The glass transition temperature is determined from a DSC curve obtained by differential scanning calorimetry (DSC). More specifically, the glass transition temperature is determined by "extrapolated glass transition onset temperature" described in the method for determining a glass transition temperature in JIS K 7121-1987, "Testing methods for transition temperatures of plastics".

The weight-average molecular weight (Mw) of the amorphous polyester resin is, for example, preferably 5,000 or more and 1,000,000 or less, and more preferably 7,000 or more and 500,000 or less.

The number-average molecular weight (Mn) of the amorphous polyester resin is, for example, preferably 2,000 or more and 100,000 or less.

The molecular weight distribution Mw/Mn of the amorphous polyester resin is, for example, preferably 1.5 or more and 100 or less, and more preferably 2 or more and 60 or less.

The weight-average molecular weight and the number-average molecular weight are measured by gel permeation chromatography (GPC). By GPC, the molecular weight is measured using GPC HLC-8120GPC manufactured by Tosoh Corporation as a measurement device, TSKgel Super HM-M (15 cm) manufactured by Tosoh Corporation as a column, and THE as a solvent. The weight-average molecular weight and the number-average molecular weight are calculated using a molecular weight calibration curve plotted using a monodisperse polystyrene standard sample from the measurement results.

The amorphous polyester resin is obtained by a well-known manufacturing method. Specifically, for example, the polyester resin is obtained by a method of setting a polymerization temperature to 180° C. or higher and 230° C. or lower, reducing the internal pressure of a reaction system as necessary, and carrying out a reaction while removing water or an alcohol generated during condensation.

In a case where monomers as raw materials are not dissolved or compatible at the reaction temperature, in order to dissolve the monomers, a solvent having a high boiling point may be added as a solubilizer. In this case, a polycondensation reaction is carried out in a state where the solubilizer is distilled off. In a case where a monomer with poor compatibility takes part in the copolymerization reaction, for example, the monomer with poor compatibility may be condensed in advance with an acid or an alcohol that is to be polycondensed with the monomer, and then polycondensed with the major component.

Crystalline Polyester Resin

Examples of the crystalline polyester resin include a polycondensate of polyvalent carboxylic acid and polyhydric alcohol. As the crystalline polyester resin, a commercially available product or a synthetic resin may be used.

Here, since the crystalline polyester resin easily forms a crystal structure, the crystalline polyester resin is, for example, preferably a polycondensate that is not formed of an aromatic-containing polymerizable monomer but is formed of a linear aliphatic polymerizable monomer.

Examples of the polyvalent carboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (such as dibasic acids such as phthalic acid, isophthalic acid, terephthalic acid, and naphthalene-2,6-dicarboxylic acid), anhydrides of these dicarboxylic acids, and lower alkyl esters (for example, having 1 or more and 5 or less carbon atoms) of these dicarboxylic acids.

As the polyvalent carboxylic acid, a carboxylic acid having a valency of 3 or more that has a crosslinked structure or a branched structure may be used in combination with a dicarboxylic acid. Examples of the trivalent carboxylic acids include aromatic carboxylic acid (for example, 1,2,3-benzenetricarboxylic acid, 1,2,4-benzenetricarboxylic acid, 1,2,4-naphthalenetricarboxylic acid, and the like), anhydrides of these aromatic carboxylic acids, and lower alkyl esters (for example, having 1 or more and 5 or less carbon atoms) of these aromatic carboxylic acids.

As the polyvalent carboxylic acid, a dicarboxylic acid having a sulfonic acid group or a dicarboxylic acid having an ethylenically double bond may be used together with these dicarboxylic acids.

One kind of polyvalent carboxylic acid may be used alone, or two or more kinds of polyvalent carboxylic acids may be used in combination.

Examples of the polyhydric alcohol include an aliphatic diol (for example, a linear aliphatic diol having 7 or more and 20 or less carbon atoms in a main chain portion). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among the aliphatic diols, for example, 1,8-octanediol, 1,9-nonanediol, or 1,10-decanediol is preferable.

As the polyhydric alcohol, an alcohol having a valency of 3 or more that has a crosslinked structure or a branched structure, may be used in combination with the diol. Examples of the alcohol having a valency of 3 or more include glycerin, trimethylolethane, and trimethylolpropane, pentaerythritol.

The polyhydric alcohol may be used alone or in combination of two or more kinds.

Here, the content of the aliphatic diol in the polyhydric alcohol may be 80% by mole or more and, for example, preferably 90% by mole or more.

The melting temperature of the crystalline polyester resin is, for example, preferably 50° C. or higher and 100° C. or lower, more preferably 55° C. or higher and 90° C. or lower, and even more preferably 60° C. or higher and 85° C. or lower.

The melting temperature is determined from a DSC curve obtained by differential scanning calorimetry (DSC) by "peak melting temperature" described in the method for determining the melting temperature in JIS K7121-1987, "Testing methods for transition temperatures of plastics".

The weight-average molecular weight (Mw) of the crystalline polyester resin is, for example, preferably 6,000 or more and 35,000 or less.

The crystalline polyester resin can be obtained by a well-known manufacturing method, for example, same as the amorphous polyester resin.

Here, as the binder resin, other binder resins may be used in combination with the polyester resin. As the other binder resins, for example, a styrene (meth)acrylic resin is preferable.

Styrene (Meth)Acrylic Resin

The styrene (meth)acrylic resin is a copolymer obtained by at least copolymerizing a monomer having a styrene skeleton and a monomer having a (meth)acryloyl group.

Furthermore, "(meth)acrylic acid" is an expression including both of "acrylic acid" and "methacrylic acid". In addition, the "(meth)acryloyl group" is an expression including both the "acryloyl group" and the "methacryloyl group".

Examples of the monomer (hereinafter, referred to as "styrene-based monomer") having a styrene skeleton include styrene, alkyl-substituted styrene (such as α-methylstyrene, 2-methylstyrene, 3-methylstyrene, 4-methylstyrene, 2-ethylstyrene, 3-ethylstyrene, or 4-ethylstyrene), halogen-substituted styrene (such as 2-chlorostyrene, 3-chlorostyrene, or 4-chlorostyrene), and vinylnaphthalene. The styrene-based monomer may be used alone or in combination of two or more kinds thereof.

Among these, from the viewpoints of reaction, ease of control of reaction, and availability, as the styrene-based monomer, for example, styrene is preferable.

Examples of the monomer having a (meth)acryloyl group (hereinafter, referred to as "(meth)acrylic monomer") include (meth)acrylic acid and (meth)acrylic acid ester. Examples of the (meth)acrylic acid ester include (meth) acrylic acid alkyl ester (such as n-methyl (meth)acrylate, n-ethyl (meth)acrylate, n-propyl (meth)acrylate, n-butyl (meth)acrylate, n-pentyl(meth)acrylate, n-hexyl(meth)acrylate, n-heptyl(meth)acrylate, n-octyl (meth)acrylate, n-decyl (meth)acrylate, n-dodecyl (meth)acrylate, n-lauryl (meth) acrylate, n-tetradecyl(meth)acrylate, n-hexadecyl(meth) acrylate, n-octadecyl(meth)acrylate, isopropyl (meth) acrylate, isobutyl (meth)acrylate, t-butyl (meth)acrylate, isopentyl (meth)acrylate, amyl(meth)acrylate, neopentyl (meth)acrylate, isohexyl(meth)acrylate, isoheptyl(meth) acrylate, isooctyl (meth)acrylate, 2-ethylhexyl (meth)acrylate, cyclohexyl (meth)acrylate, or t-butylcyclohexyl (meth) acrylate), (meth)acrylic acid aryl ester (such as phenyl (meth)acrylate, biphenyl (meth)acrylate, diphenylethyl (meth)acrylate, t-butylphenyl (meth)acrylate, or terphenyl (meth)acrylate), dimethylaminoethyl (meth)acrylate, diethylaminoethyl (meth)acrylate, methoxyethyl (meth)acrylate, 2-hydroxyethyl (meth)acrylate, β-carboxyethyl (meth)acrylate, and (meth)acrylamide. The (meth)acrylic acid-based monomer may be used alone or in combination of two or more kinds thereof.

The copolymerization ratio of the styrene-based monomer to the (meth)acrylic monomer (on a mass basis, styrene-based monomer/(meth)acrylic monomer) may be, for example, 85/15 to 70/30.

The styrene (meth)acrylic resin may have, for example, a crosslinked structure from the viewpoint of suppressing offset of an image. Examples of the styrene (meth)acrylic resin having a crosslinked structure include a crosslinked product crosslinked by at least copolymerizing a monomer having a styrene skeleton, a monomer having a (meth) acrylic acid skeleton, and a crosslinkable monomer.

Examples of the crosslinkable monomer include bifunctional or higher functional crosslinking agents.

Examples of the bifunctional crosslinking agent include divinylbenzene, divinylnaphthalene, a di(meth)acrylate compound (such as diethylene glycol di(meth)acrylate, methylenebis(meth)acrylamide, decanediol diacrylate, and glycidyl (meth)acrylate), polyester-type di(meth)acrylate, and 2-([1'-methylpropylideneamino]carboxyamino)ethyl methacrylate.

Examples of the polyfunctional crosslinking agent include a tri(meth)acrylate compound (such as pentaerythritol tri(meth)acrylate, trimethylolethane tri(meth)acrylate, or trimethylolpropane tri(meth)acrylate), a tetra(meth)acrylate compound (such as tetramethylolmethane tetra(meth) acrylate or oligoester (meth)acrylate), 2,2-bis(4-methacryloxy polyethoxyphenyl)propane, diallyl phthalate, triallyl cyanurate, triallyl isocyanurate, triallyl trimellitate, and diallyl chlorendate.

The copolymerization ratio of the crosslinkable monomer to the total monomers (on a mass basis, crosslinkable monomer/total monomers) may be, for example, 2/1,000 to 30/1,000.

From the viewpoint of suppressing offset of an image, the weight-average molecular weight (Mw) of the styrene (meth)acrylic resin may be, for example, 30,000 or more and 200,000 or less, and is preferably 40,000 or more and 100,000 or less and more preferably 50,000 or more and 80,000 or less.

The weight-average molecular weight of the styrene (meth)acrylic resin is a value measured by the same method as the weight-average molecular weight of the polyester resin.

From the viewpoints of achieving both the fluidity and storage property of the toner and the suppression of offset of an image, the content of the styrene (meth)acrylic resin may be, for example, 10% by mass or more and 30% by mass or less, and is preferably 12% by mass or more and 28% by mass or less and more preferably 15% by mass or more and 25% by mass or less with respect to the toner particles.

Furthermore, other binder resins may be used in combination as the binder resin.

Examples of the other binder resins include vinyl-based resins consisting of a homopolymer of a monomer, such as styrenes (for example, styrene, p-chlorostyrene, α-methylstyrene, and the like), (meth)acrylic acid esters (for example, methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, 2-ethylhexyl methacrylate, and the like), ethylenically unsaturated nitriles (for example, acrylonitrile, methacrylonitrile, and the like), vinyl ethers (for example, vinyl methyl ether, vinyl isobutyl ether, and the like), vinyl ketones (for example, vinyl methyl ketone, vinyl ethyl ketone, vinyl isopropenyl ketone, and the like), olefins (for example, ethylene, propylene, butadiene, and the like), or a copolymer obtained by combining two or more kinds of monomers described above.

Examples of the other binder resins include non-vinyl-based resins such as an epoxy resin, a polyester resin, a polyurethane resin, a polyamide resin, a cellulose resin, a polyether resin, and modified rosin, mixtures of these with the vinyl-based resins, or graft polymers obtained by polymerizing a vinyl-based monomer together with the above resins.

One kind of each of these other binder resins may be used alone, or two or more kinds of these binder resins may be used in combination.

The content of the binder resin is, for example, preferably 40% by mass or more and 95% by mass or less, more preferably 50% by mass or more and 90% by mass or less, and even more preferably 60% by mass or more and 85% by mass or less with respect to the entire toner particles.

Colorant

Examples of the colorant include various pigments such as carbon black, chrome yellow, Hansa yellow, benzidine yellow, threne yellow, quinoline yellow, pigment yellow, permanent orange GTR, pyrazolone orange, vulcan orange, watch young red, permanent red, brilliant carmine 3B, brilliant carmine 6B, Dupont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, and malachite green oxalate; and various dyes such as an acridine-based dye, a xanthene-based dye, an azo-based dye, a benzoquinone-based dye, an azine-based dye, an anthraquinone-based dye, a thioindigo-based dye, a dioxazine-based dye, a thiazine-based dye, an azomethine-based dye, an indigo-based dye, a phthalocyanine-based dye, an aniline black-based dye, a polymethine-based dye, a triphenylmethane-based dye, a diphenylmethane-based dye, and a thiazole-based dye.

One kind of colorant may be used alone, or two or more kinds of colorants may be used in combination.

As the colorant, a colorant having undergone a surface treatment as necessary may be used, or a dispersant may be used in combination with the colorant. Furthermore, a plurality of kinds of colorants may be used in combination.

The content of the colorant with respect to the entire toner particles is, for example, preferably 1% by mass or more and 30% by mass or less, and more preferably 3% by mass or more and 15% by mass or less.

Other Additives

Examples of the other additives in the toner include well-known additives such as a magnetic material, a charge control agent, and inorganic powder. The additives are incorporated into the toner particles as internal additives.

Characteristics of Toner Particles

The toner particles may be toner particles that have a single-layer structure or toner particles having a so-called core/shell structure that is configured with a core portion (core particle) and a coating layer (shell layer) covering the core portion, and for example, is preferably the core/shell structure. The toner particles having a core/shell structure are, for example, preferably configured with a core portion that is configured with a binder resin and a colorant, and a coating layer that is configured with a binder resin and a release agent.

The volume-average particle size (D50v) of the toner particles is, for example, preferably 2 μm or more and 10 μm or less, and more preferably 4 μm or more and 8 μm or less.

The various average particle sizes and various particle size distribution indexes of the toner particles are measured using COULTER MULTISIZER II (manufactured by Beckman Coulter Inc.) and using ISOTON-II (manufactured by Beckman Coulter Inc.) as an electrolytic solution.

For measurement, a measurement sample in an amount of 0.5 mg or more and 50 mg or less is added to 2 ml of a 5% by mass aqueous solution of a surfactant (for example, preferably sodium alkylbenzene sulfonate) as a dispersant. The solution is added to 100 ml or greater and 150 ml or less of the electrolytic solution.

The electrolytic solution in which the sample is suspended is subjected to a dispersion treatment for 1 minute with an ultrasonic disperser, and the particle size distribution of particles having a particle size in a range of 2 μm or more and 60 μm or less is measured using COULTER MULTISIZER II with an aperture having an aperture size of 100 μm. The number of particles to be sampled is 50,000.

For the particle size range (channel) divided based on the measured particle size distribution, a cumulative volume distribution and a cumulative number distribution are drawn from small-sized particles. The particle size at which the cumulative proportion of particles is 16% is defined as a volume-based particle size D16v and a number-based particle size D16p. The particle size at which the cumulative proportion of particles is 50% is defined as a volume-average particle size D50v and a number-average particle size D50p. The particle size at which the cumulative proportion of particles is 84% is defined as a volume-based particle size D84v and a number-based particle size D84p.

By using these, a volume-average particle size distribution index (GSDv) is calculated as $(D84v/D16v)^{1/2}$ and a number-average particle size distribution index (GSDp) is calculated as $(D84p/D16p)^{1/2}$.

The shape factor SF1 of the toner particles is, for example, preferably 110 or more and 150 or less and more preferably 120 or more and 140 or less.

The shape factor SF1 is obtained by the following equation.

$$SF1=(ML^2/A)\times(\pi/4)\times 100 \quad \text{Equation}$$

In the above equation, ML represents the absolute maximum length of the toner, and A represents the projected area of the toner.

Specifically, the shape factor SF1 is quantified generally by analyzing a microscopic image or a scanning electron microscopic image using an image analyzer, and is calculated as follows. That is, the shape factor SF1 is obtained by capturing an optical microscopic image of particles scattered on the surface of the slide glass into a LUZEX image analyzer with a video camera, obtaining the maximum length and the projected area of 100 particles, and calculating with the above equation to obtain the average value thereof.

External Additive

The toner may further contain an external additive in addition to the toner particles.

Examples of the external additive include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO\cdot SiO_2$, $K_2O\cdot(TiO_2)_n$, $Al_2O_3\cdot 2SiO_2$, $CaCO_3$, $MgCO_3$, $BaSO_4$, and $MgSO_4$.

The surface of the inorganic particles serving as the external additive may be subjected to, for example, a hydrophobic treatment. The hydrophobic treatment is performed, for example, by dipping the inorganic particles in a hydrophobic treatment agent. The hydrophobic treatment agent is not particularly limited, and examples thereof include a silane-based coupling agent, silicone oil, a titanate-based coupling agent, an aluminum-based coupling agent, and the like. Such hydrophobic treatment agent may be used alone or in combination of two or more kinds thereof.

The amount of the hydrophobic treatment agent is, for example, 1 part by mass or greater and 10 parts by mass or less with respect to 100 parts by mass of the inorganic particles.

Examples of the external additive also include resin particles (resin particles of polystyrene, polymethylmethacrylate (PMMA), a melamine resin, or the like), a cleaning activator (for example, and a metal salt of a higher fatty acid represented by zinc stearate or fluorine-based polymer particles), and the like.

The amount of the external additive externally added is, for example, preferably 0.01% by mass or more and 5% by mass or less, and more preferably 0.01% by mass or more and 2.0% by mass or less with respect to the toner particles.

Manufacturing Method of Toner

The toner used in the image forming apparatus according to the present exemplary embodiment manufactures toner particles, and in a case where the toner particles further contain an external additive, the toner particles are manufactured by externally adding an external additive.

The toner particles may be manufactured by any of a dry manufacturing method (for example, a kneading and pulverizing method or the like) or a wet manufacturing method (for example, an aggregation and coalescence method, a suspension polymerization method, a dissolution suspension method, or the like). There are no particular restrictions on these manufacturing methods, and well-known manufacturing methods are adopted. Among the above methods, for example, the toner particles are preferably obtained by the aggregation and coalescence method.

Hereinafter, details of each step of the aggregation and coalescence method will be described. In the following section, a method for obtaining toner particles containing a colorant will be described. The colorant is used as necessary. Naturally, other additives different from the colorant may also be used.

Resin Particle Dispersion Preparing Step

First, a resin particle dispersion in which polyester resin particles to be a binder resin are dispersed, a colorant dispersion in which colorant particles are dispersed, and a release agent particle dispersion in which release agent particles are dispersed are prepared.

The polyester resin particle dispersion is prepared, for example, by dispersing the polyester resin particles in a dispersion medium by using a surfactant.

Examples of the dispersion medium used for the polyester resin particle dispersion include an aqueous medium.

Examples of the aqueous medium include distilled water, water such as deionized water, alcohols, and the like. Each of these media may be used alone, or two or more of these media may be used in combination.

Examples of the surfactant include an anionic surfactant based on a sulfuric acid ester salt, a sulfonate, a phosphoric acid ester, soap, and the like; a cationic surfactant such as an amine salt-type cationic surfactant and a quaternary ammonium salt-type cationic surfactant; a nonionic surfactant based on polyethylene glycol, an alkylphenol ethylene oxide adduct, and a polyhydric alcohol, and the like. Among these, an anionic surfactant and a cationic surfactant are particularly mentioned. The nonionic surfactant may be used in combination with an anionic surfactant or a cationic surfactant.

One surfactant may be used alone, or two or more surfactants may be used in combination.

Examples of the method for dispersing the polyester resin particles in the dispersion medium include general dispersion methods such as a rotary shearing homogenizer, a ball mill having media, a sand mill, and a dyno mill. Alternatively, the polyester resin particles may be dispersed in the dispersion medium by using a transitional phase inversion emulsification method. The transitional phase inversion emulsification method is a method of dissolving a resin to be dispersed in a hydrophobic organic solvent in which the resin is soluble, adding a base to an organic continuous phase (O phase) for causing neutralization, and then adding water (W phase), such that the resin undergoes phase transition from W/O to O/W and is dispersed in the aqueous medium in the form of particles.

The volume-average particle size of the polyester resin particles dispersed in the polyester resin particle dispersion is, for example, preferably 0.01 μm or more and 1 μm or less, more preferably 0.08 μm or more and 0.8 μm or less, and even more preferably 0.1 μm or more and 0.6 μm or less.

For determining the volume-average particle size of the polyester resin particles, a particle size distribution is measured using a laser diffraction-type particle size distribution analyzer (for example, LA-700 manufactured by HORIBA, Ltd.), a cumulative volume distribution from small-sized particles is drawn for the particle size range (channel) divided using the obtained particle size distribution, and the particle size at which the cumulative proportion of particles is 50% of all particles is defined as a volume-average particle size D50v. For particles in other dispersions, the volume-average particle size is measured in the same manner.

The content of the polyester resin particles contained in the polyester resin particle dispersion is, for example, preferably 5% by mass or more and 50% by mass or less and more preferably 10% by mass or more and 40% by mass or less.

A colorant dispersion and a release agent particle dispersion are prepared in the same manner as in the polyester resin particle dispersion. That is, the dispersion medium, the dispersion method, the volume-average particle size of the particles, and the content of the particles in the polyester resin particle dispersion are the same for the colorant dispersion and the release agent particle dispersion.

First Aggregated Particle-Forming Step

Next, the polyester resin particle dispersion is mixed with the colorant dispersion.

Then, in the mixed dispersion, the polyester resin particles and the colorant particles are hetero-aggregated to form first aggregated particles which have a diameter close to the diameter of the target toner particles and include the polyester resin particles and the colorant particles.

A release agent particle dispersion may also be mixed as necessary, and the release agent particles may be contained in the first aggregated particles.

Specifically, for example, the first aggregated particles are formed by adding an aggregating agent to the mixed dispersion, adjusting the pH of the mixed dispersion to be acidic (for example, a pH of 2 or more and 5 or less), adding a dispersion stabilizer thereto as necessary, heating the mixture to a temperature close to the glass transition temperature of the polyester resin (specifically, for example, a temperature higher than or equal to the glass transition temperature of the polyester resin−30° C. and lower than or equal to the glass transition temperature thereof−10° C.), and allowing the particles to be dispersed in the mixed dispersion to be aggregated.

In the first aggregated particle-forming step, for example, the heating may be performed after the mixed dispersion is stirred with a rotary shearing homogenizer, the aggregating agent is added thereto at room temperature (for example, 25° C.), the pH of the mixed dispersion is adjusted to be acidic (for example, a pH of 2 or more and 5 or less), and the dispersion stabilizer is added thereto as necessary.

Examples of the aggregating agent include a surfactant having polarity opposite to the polarity of the surfactant contained in the mixed dispersion, an inorganic metal salt, and a metal complex having a valency of 2 or higher. In a case where a metal complex is used as the aggregating agent, the amount of the aggregating agent used is reduced, and the charging characteristics are improved.

In addition to the aggregating agent, an additive that forms a complex or a bond similar to the complex with a metal ion of the aggregating agent may be used. As such an additive, a chelating agent is used.

Examples of the inorganic metal salt include metal salts such as calcium chloride, calcium nitrate, barium chloride, magnesium chloride, zinc chloride, aluminum chloride, and aluminum sulfate; inorganic metal salt polymers such as polyaluminum chloride, polyaluminum hydroxide, and calcium polysulfide; and the like.

As the chelating agent, a water-soluble chelating agent may also be used. Examples of the chelating agent include oxycarboxylic acids such as tartaric acid, citric acid, and gluconic acid; aminocarboxylic acids such as iminodiacetic acid (IDA), nitrilotriacetic acid (NTA), and ethylenediaminetetraacetic acid (EDTA); and the like.

The amount of the chelating agent added with respect to 100 parts by mass of resin particles is, for example, preferably 0.01 parts by mass or more and 5.0 parts by mass or less, and more preferably 0.1 parts by mass or more and less than 3.0 parts by mass.

Second Aggregated Particle-Forming Step

The first aggregated particle dispersion in which the first aggregated particles are dispersed is obtained, and the first aggregated particle dispersion are then mixed with the polyester resin particle dispersion and the release agent particle dispersion. The polyester resin particle dispersion may be mixed with the release agent particle dispersion in advance, and this mixed liquid may be mixed with the first aggregated particle dispersion.

Then, in the mixed dispersion in which the first aggregated particles, the polyester resin particles, and the release agent particles are dispersed, the polyester resin particles and the release agent particles are aggregated to be adhered to the surface of the first aggregated particles, thereby forming second aggregated particles.

Specifically, for example, in the first aggregated particle-forming step, in a case where the first aggregated particles reach a target particle size, a dispersion in which the polyester resin particles and the release agent particles are dispersed is mixed with the first aggregated particle dispersion. Next, the mixed dispersion is heated at a temperature equal to or lower than the glass transition temperature of the polyester resin, the pH of the mixed dispersion is adjusted to, for example, a range of about 6.5 or more and 8.5 or less, and the progress of aggregation is stopped.

Accordingly, the second aggregated particles aggregated such that the polyester resin particles and the release agent particles adhere to the surface of the first aggregated particles are obtained.

Coalescence Step

The second aggregated particle dispersion in which the second aggregated particles are dispersed is then heated to, for example, a temperature equal to or higher than the glass transition temperature of the polyester resin (for example, a temperature equal to or higher than the glass transition temperature of the polyester resin by 10° C. to 50° C.) to coalesce the second aggregated particles, thereby forming toner particles.

Toner particles are obtained through the above steps.

The toner particles may be manufactured, after obtaining a second aggregated particle dispersion in which the second aggregated particles are dispersed, through a step of mixing the second aggregated particle dispersion with a polyester resin particle dispersion in which polyester resin particles are dispersed to cause the polyester resin particles to be aggregated and adhered to the surface of the second aggregated particles and to form third aggregated particles, and a step of heating the third aggregated particle dispersion in which the third aggregated particles are dispersed to cause the third aggregated particles to coalesce and to form toner particles.

After the coalescence step ends, the toner particles formed in a solution are subjected to a known washing step, a solid-liquid separation step, and a drying step, thereby obtaining dry toner particles.

The washing step is not particularly limited. However, from the viewpoint of charging properties, displacement washing may be thoroughly performed using deionized water. The solid-liquid separation step is not particularly limited. However, in view of productivity, suction filtration, pressure filtration, or the like may be performed. Furthermore, the method of the drying step is not particularly limited. However, in view of productivity, freeze drying, flush drying, fluidized drying, vibratory fluidized drying, or the like may be performed.

For example, by adding an external additive to the dry toner particles and mixing the external additive and the toner particles together, the toner according to the present exemplary embodiment is manufactured. The mixing may be performed, for example, using a V blender, a Henschel mixer, a Lödige mixer, or the like. Furthermore, coarse particles of the toner may be removed as necessary by using a vibratory sieving machine, a pneumatic sieving machine, or the like.

Electrostatic Charge Image Developer

In the present exemplary embodiment, the electrostatic charge image developer accommodated in the developing unit contains at least the above-mentioned toner. The electrostatic charge image developer may be a one-component developer which contains only the toner or a two-component developer which is obtained by mixing together the toner and a carrier.

The carrier is not particularly limited, and examples thereof include known carriers. Examples of the carrier include a coated carrier obtained by coating the surface of a core material consisting of magnetic powder with a resin; a magnetic powder dispersion-type carrier obtained by dispersing and mixing magnetic powder in a matrix resin; and a resin impregnation-type carrier obtained by impregnating porous magnetic powder with a resin; and the like. Each of the magnetic powder dispersion-type carrier and the resin impregnation-type carrier may be a carrier obtained by coating the surface of a core material, which is particles constituting the carrier, with a resin.

Examples of the magnetic powder include magnetic metals such as iron, nickel, and cobalt; magnetic oxides such as ferrite and magnetite; and the like.

Examples of the conductive particles include metals such as gold, silver, and copper, and particles such as carbon black, titanium oxide, zinc oxide, tin oxide, barium sulfate, aluminum borate, potassium titanate, and the like.

Examples of the coating resin and matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin configured with an organosiloxane bond or a product obtained by modifying the straight silicone resin, a fluororesin, polyester, polycarbonate, a phenol resin, an epoxy resin, and the like. The coating resin and the matrix resin may contain additives such as conductive material.

The surface of the core material is coated with a resin, for example, by a coating method using a solution for forming a coating layer obtained by dissolving the coating resin and various additives (used as necessary) in an appropriate solvent, and the like. The solvent is not particularly limited, and may be selected in consideration of the type of the resin used, coating suitability, and the like. Specifically, examples of the resin coating method include an immersion method of immersing the core material in the solution for forming a coating layer; a spray method of spraying the solution for forming a coating layer to the surface of the core material; a fluidized bed method of spraying the solution for forming a coating layer to the core material that is floating by an air flow; a kneader coater method of mixing the core material of the carrier with the solution for forming a coating layer in a kneader coater and then removing solvents; and the like.

The mixing ratio (mass ratio) between the toner and the carrier, represented by toner:carrier, in the two-component developer is, for example, preferably 1:100 to 30:100 and more preferably 3:100 to 20:100.

Cleaning Blade

A cleaning blade used in the image forming apparatus according to the present exemplary embodiment will be described. The cleaning blade is constituted of a polyurethane resin. The cleaning blade has an indentation elastic modulus of 15 MPa or more and 35 MPa or less on a surface (contact portion) which is brought into contact with the transfer opposing belt. In addition, in the cleaning blade, the total amount of F and Si present within 200 nm from the surface (contact portion) which is brought into contact with the transfer opposing belt accounts for 75% or more of a total amount of F and Si present within 5 m from the surface.

The cleaning blade may be a blade of single-layered constitution consisting of one layer, may be a blade of two-layered constitution consisting of an edge layer (a layer which is brought into contact with the transfer opposing belt) and a back surface layer, or may be a constitution in which three or more layers are laminated.

Indentation Elastic Modulus

The cleaning blade has an indentation elastic modulus of 15 MPa or more and 35 MPa or less on a surface (contact portion) which is brought into contact with the transfer opposing belt. In a case where the indentation elastic modulus is 15 MPa or more, the occurrence of slip-through of the toner at a contact part of the cleaning blade with the transfer opposing belt is suppressed. In a case where the indentation elastic modulus is 35 MPa or less, the occurrence of toner filming on the surfaces of the transfer opposing belt is suppressed. Furthermore, the indentation elastic modulus is, for example, preferably 20 MPa or more and 30 MPa or less and more preferably 22 MPa or more and 28 MPa or less.

The indentation elastic modulus is measured from the inclination in a load range of 65% or more and 95% or less of the maximum load in the unloading curve obtained at the time of unloading in the load-intrusion amount curve of the indenter in accordance with ISO14577 (2002). The measurement conditions are as follows.

Measurement device: nano indentation method, Dynamic ultra-micro hardness tester "Product name PICODENTOR HM500, (manufactured by Fischer Instruments K.K.)"

Indenter: conical Berkovich diamond indenter with surface angle of 1200

Indentation depth of indenter: 20 μm

Indentation speed of indenter: 12.5 μm/sec

Unloading speed of indenter: 12.5 μm/sec

The above measurement is performed on the surface (contact portion) of the cleaning blade which is brought into contact with the transfer opposing belt.

Surface Layer Ratio of F and Si

In the cleaning blade, a ratio (surface layer ratio of F and Si) of the total amount of F and Si present within 200 nm from the surface (contact portion) which is brought into contact with the transfer opposing belt to the total amount of F and Si present within 5 μm from the surface is 75% or more. In a case where the surface layer ratio of F and Si in the contact portion of the cleaning blade is 75% or more, the friction of the contact portion of the cleaning blade is reduced, and the occurrence of wear is suppressed. The surface layer ratio of F and Si in the contact portion of the cleaning blade is, for example, preferably 85% or more and more preferably 90% or more.

On the other hand, the upper limit value of the surface layer ratio of F and Si in the contact portion of the cleaning blade is not particularly limited, but is preferably 95% or less and more preferably 93% or less. In a case where the surface layer ratio of F and Si in the contact portion of the cleaning blade is 95% or less, the occurrence of belly contact (decrease in surface pressure) due to insufficient tuck formation in the contact portion of the cleaning blade is suppressed.

Amount of Surface F and Si

The total amount of F and Si (the amount of surface F and Si) present on the surface (contact portion) of the cleaning blade which is brought in contact with the transfer opposing belt is, for example, preferably 15 atm % or more, more preferably 18 atm % or more, and even more preferably 20 atm % or more. In a case where the amounts of the surface F and Si in the contact portion of the cleaning blade are 15 atm % or more, the friction of the contact portion of the cleaning blade is reduced, and the occurrence of wear is suppressed.

The upper limit value of the amount of the surface F and Si in the contact portion of the cleaning blade is not particularly limited, but is, from the viewpoint of suppressing the occurrence of chipping in the contact portion of the cleaning blade, preferably 25 atm % or less and more preferably 22 atm % or less.

Amount of 50 nm Position F and Si

The total amount of F and Si (the amount of 50 nm position F and Si) present at a position of 50 nm from the surface (contact portion) of the cleaning blade which is brought in contact with the transfer opposing belt is, for example, preferably 0.3 atm % or more, more preferably 0.5 atm % or more, and even more preferably 1.0 atm % or more. In a case where the amount of the 50 nm position F and Si of the cleaning blade is 0.3 atm % or more, low friction at the contact portion of the cleaning blade is maintained, and the occurrence of wear is suppressed even at a lapse of time.

The upper limit value of the amount of the 50 nm position F and Si of the cleaning blade is not particularly limited, but is, from the viewpoint of suppressing the occurrence of chipping in the contact portion of the cleaning blade even at a lapse of time, preferably 7.0 atm % or less, more preferably 5.0 atm % or less, and even more preferably 2.0 atm % or less.

A method of measuring a ratio (surface layer ratio of F and Si) of the total amount of F and Si present within 200 nm from the surface (contact portion) which is brought into contact with the transfer opposing belt to the total amount of F and Si present within 5 μm from the surface in the cleaning blade will be described. That is, a method of analyzing the amount of F element and the amount of Si element in the depth direction from the contact portion of the cleaning blade will be described.

A region including a surface (contact portion) of the cleaning blade which is brought into contact with the transfer opposing belt is cut out, and an amount (atm %) of each of N, C, O, F, and Si elements is measured with XPS (Versa Probe II, manufactured by Ulvac-PHI, Inc.) in the depth direction from the contact portion.

In addition, the total amount of F and Si present on the surface (contact portion) of the cleaning blade which is brought into contact with the transfer opposing belt is obtained by calculating the ratio from the equation of SB/SA×100 in a case where the area up to a depth of 5 μm is defined as SA and the area up to a depth of 200 nm is defined as SB in the plot of the depth from the contact portion and the element ratio of the cleaning blade, which are obtained by the above-mentioned analysis in the depth direction. The total amount of F and Si present at a position of 50 nm from the surface (contact portion) of the cleaning blade which is brought into contact with the transfer opposing belt is also obtained in the same manner.

Constitution

The cleaning blade is constituted of a polyurethane resin.

Polyurethane Resin

The polyurethane resin is a polyurethane resin obtained by polymerizing at least a polyol component and a polyisocyanate component. The polyurethane resin may be, as necessary, polyurethane resin obtained by polymerizing a resin containing a functional group capable of reacting with an isocyanate group of a polyisocyanate in addition to the polyol component.

The polyurethane resin preferably includes, for example, a hard segment and a soft segment. The term “hard segment” denotes, among polyurethane resin materials, a segment in which the material constituting the hard segment is relatively harder than the material constituting the soft segment, and the term “soft segment” denotes a segment in which the material constituting the soft segment is relatively softer than the material constituting the hard segment.

Examples of the material constituting the hard segment (hard segment material) include low-molecular-weight polyol components among polyol components and resins containing a functional group capable of reacting with an isocyanate group of a polyisocyanate. On the other hand, examples of the material constituting the soft segment (soft segment material) include high-molecular-weight polyol components among polyol components.

The average particle size of aggregates of the hard segment is, for example, preferably 1 μm or more and 10 μm or less, and more preferably 1 μm or more and 5 μm or less.

In a case where the average particle size of the aggregates of the hard segment is 1 μm or more, the frictional resistance of the surface of the contact member is likely to be reduced. Therefore, the behavior of the blade is stabilized, and local wear is likely to be suppressed.

On the other hand, in a case where the average particle size of the aggregates of the hard segment is 10 μm or less, the occurrence of chipping is likely to be suppressed.

The average particle size of the aggregates of the hard segment is measured as follows. By using a polarizing microscope (BX51-P manufactured by Olympus Corporation), an image is captured at 20× magnification, and image processing is performed to convert the image into a binary image. For each of 20 cleaning blades, particle sizes (equivalent circle diameters) of aggregates are measured at 5 spots (at each spot, particle sizes of 5 aggregates are measured), and the average particle size of the 500 aggregates is calculated.

Further, the binarization of the image is carried out by adjusting the thresholds of the hue, the chroma, and the brightness using image processing software OLYMPUS Stream essentials (manufactured by Olympus Corporation) such that the color of the aggregates of the crystal part and the hard segment is black and the color of the amorphous part (corresponding to the soft segment) is white.

Polyol Component

The polyol component contains a high-molecular-weight polyol and a low-molecular-weight polyol.

The high-molecular-weight polyol component is a polyol having a number-average molecular weight of 500 or greater (for example, preferably 500 or greater and 5,000 or less). Examples of the high-molecular-weight polyol component include known polyols such as a polyester polyol obtained by dehydration condensation of a low-molecular-weight polyol and a dibasic acid, a polycarbonate polyol obtained by a reaction between a low-molecular-weight polyol and an alkyl carbonate, a polycaprolactone polyol, and a polyether polyol. Examples of commercially available products of high-molecular-weight polyols include PLACCEL 205 and PLACCEL 240 manufactured by Daicel Corporation.

Here, the number-average molecular weight is a value measured by a gel permeation chromatography (GPC) method. The same applies hereinafter.

These high-molecular-weight polyols may be used alone or in combination of two or more kinds thereof.

The polymerization ratio of the high-molecular-weight polyol component may be, for example, preferably 30% by mole or greater and 50% by mole or less and is preferably 40% by mole or greater and 50% by mole or less with respect to the total polymerization component of the polyurethane resin.

The low-molecular-weight polyol component is a polyol having a molecular weight (number-average molecular weight) of less than 500. The low-molecular-weight polyol is a material that functions as a chain extender and a crosslinking agent.

Examples of the low-molecular-weight polyol component include 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol. Among these, for example, 1,4-butanediol is preferably employed as the low-molecular-weight polyol component.

Examples of the low-molecular-weight polyol component include a diol (bifunctional), a triol (trifunctional), and a tetraol (tetrafunctional), which are known as chain extenders and crosslinking agents.

These polyols may be used alone or in combination of two or more kinds thereof.

The polymerization ratio of the low-molecular-weight polyol components to the total polymerization components of the polyurethane resin may be, for example, more than 50% by mole and 75% by mole or less, preferably 52% by mole or more and 75% by mole or less, more preferably 55% by mole or more and 75% by mole or less, and even more preferably 55% by mole or more and 60% by mole or less.

Polyisocyanate Component

Examples of the polyisocyanate component include 4,4'-diphenylmethane diisocyanate (MDI), 2,6-toluene diisocyanate (TDI), 1,6-hexane diisocyanate (HDI), 1,5-naphthalene diisocyanate (NDI), and 3,3'-dimethylbiphenyl-4,4'-diisocyanate (TODI).

As the polyisocyanate component, for example, 4,4'-diphenylmethane diisocyanate (MDI), 1,5-naphthalene diisocyanate (NDI), or hexamethylene diisocyanate (HDI) is more desirable.

These polyisocyanate components may be used alone or in combination of two or more kinds thereof.

The polymerization ratio of the polyisocyanate component to the total polymerization components of the polyurethane resin may be, for example, 5% by mole or more and 25% by mole or less, and preferably 10% by mole or more and 20% by mole or less.

Resin Containing Functional Group Capable of Reacting with Isocyanate Group

As the resin containing a functional group capable of reacting with an isocyanate group (hereinafter, referred to as "functional group-containing resin"), for example, a resin having flexibility is desirable, and an aliphatic resin having a linear structure is more desirable from the viewpoint of flexibility. Specific examples of the functional group-containing resin include an acrylic resin containing two or more hydroxyl groups, a polybutadiene resin containing two or more hydroxyl groups, and an epoxy resin containing two or more epoxy groups.

Examples of commercially available products of the acrylic resin containing two or more hydroxyl groups include ACTFLOW (grades: UMB-2005B, UMB-2005P, UMB-2005, UME-2005, and the like, manufactured by Soken Chemical & Engineering Co., Ltd.).

Examples of commercially available products of the polybutadiene resin containing two or more hydroxyl groups include R-45HT manufactured by Idemitsu Kosan Co., Ltd.

As the epoxy resin having two or more epoxy groups, for example, an epoxy resin is desirable which is not hard and brittle just as the general epoxy resins of the related art and is more flexible and tougher than the epoxy resin of the related art. As such an epoxy resin, for example, in view of molecular structure, an epoxy resin is preferable which has a structure (flexible skeleton) capable of improving mobility of the main chain in the main chain structure of the epoxy resin. Examples of the flexible skeleton include an alkylene skeleton, a cycloalkane skeleton, and a polyoxyalkylene skeleton. Among these, for example, a polyoxyalkylene skeleton is particularly preferable.

In addition, in terms of the physical properties, compared to the epoxy resin of the related art, for example, an epoxy resin having a low viscosity relative to the molecular weight is preferable. Specifically, for example, the weight-average molecular weight is in a range of 900±100 and the viscosity at 25° C. is desirably in a range of 15,000±5,000 mPa s and more desirably in a range of 15,000±3,000 mPa s. Examples of commercially available products of the epoxy resin having the above-described characteristics include EPICLON EXA-4850-150 (manufactured by DIC Corporation).

The polymerization ratio of the functional group-containing resin may be, for example, within a range not impairing the characteristics of the cleaning blade.

Manufacturing Method of Polyurethane Resin

In the manufacturing method of polyurethane resin, a general manufacturing method of polyurethane such as a prepolymer method or a one-shot method. From the viewpoint of obtaining polyurethane having excellent abrasion resistance and excellent chipping resistance, the prepolymer method is preferable for the present exemplary embodiment, but the manufacturing method is not limited thereto.

The cleaning blade is produced by molding a composition for forming a cleaning blade prepared by the above method into a sheet by using, for example, centrifugal molding, extrusion molding, or the like and processing the sheet by cutting or the like.

Examples of the catalyst used for producing the polyurethane resin include an amine-based compound such as a tertiary amine, a quaternary ammonium salt, and an organometallic compound such as an organic tin compound.

Examples of the tertiary amine include trialkylamine such as triethylamine, tetraalkyl diamine such as N,N,N',N'-tetramethyl-1,3-butanediamine, aminoalcohol such as dimethylethanolamine, esteramine such as ethoxylated amine, ethoxylated diamine, or bis(diethylethanolamine)adipate, a cyclohexylamine derivative such as triethylenediamine (TEDA) or N,N-dimethylcyclohexylamine, a morpholine derivative such as N-methylmorpholine or N-(2-hydroxypropyl)-dimethylmorpholine, and a piperazine derivative such as N,N'-diethyl-2-methylpiperazine or N,N'-bis-(2-hydroxypropyl)-2-methylpiperazine.

Examples of the quaternary ammonium salt include 2-hydroxypropyltrimethylammonium octylate, 1,5-diazabicyclo [4.3.0]nonen-5 (DBN) octylate, 1,8-diazabicyclo[5.4.0]undecen-7 (DBU)-octylate, DBU-oleate, DBU-p-toluenesulfonate, DBU-formate, and 2-hydroxypropyltrimethylammonium formate.

Examples of the organic tin compound include a dialkyltin compound such as dibutyltin dilaurate or dibutyltin di(2-ethylhexoate), stannous 2-ethylcaproate, and stannous oleate.

Among these catalysts, in view of hydrolysis resistance, triethylenediamine (TEDA), which is a tertiary ammonium salt, is used. Furthermore, in view of processability, a quaternary ammonium salt is used.

Among the quaternary ammonium salts, 1,5-diazabicyclo [4.3.0]nonen-5 (DBN) octylate, 1,8-diazabicyclo[5.4.0]undecen-7 (DBU)-octylate, or DBU-formate with high reaction activity is used.

The content of the catalyst is, for example, preferably in a range of 0.0005% by mass or greater and 0.03% by mass or less and particularly preferably 0.001% by mass or greater and 0.01% by mass or less of the entire polyurethane resin constituting the contact member.

These may be used alone or in combination of two or more kinds thereof.

Production of Cleaning Blade with Two-Layered Structure

For example, in a case where the cleaning blade has a two-layered constitution of an edge layer and a back surface layer, the cleaning blade is produced by manufacturing an edge layer and a back surface layer by the manufacturing method of a polyurethane resin, and bonding the obtained edge layer and back surface layer to each other.

Examples of the method in a case where the hardness of the edge layer and the hardness of the back surface layer are set to be different include a method of changing the material of the polyurethane resin, and include, for example, a method of changing the ratio of the hard segment and the soft segment.

Modification Treatment of Contact Portion

In the present exemplary embodiment, since the ratio (surface layer ratio of F and Si) of the total amount of F and Si present within 200 nm from the surface (contact portion) of the cleaning blade which is brought in contact with the transfer opposing belt to the total amount of F and Si present within 5 μm from the surface is set to the above-mentioned range, for example, a modified layer obtained by impregnating the contact portion of the obtained cleaning blade with at least one of a F element or a Si element and performing surface modification treatment is preferably provided.

The modified layer is a layer obtained by impregnating the contact portion of the cleaning blade with a surface treatment liquid containing an isocyanate compound, an organic solvent, and a specific polymer having at least one of a F element or a Si element, and curing the surface treatment liquid (that is, the isocyanate compound and the specific polymer).

The modified layer is formed as a layer integrated with the surface layer of the contact portion such that the density of the layer gradually decreases toward the inside from the surface.

Examples of the isocyanate compound include 2,6-tolylene diisocyanate (TDI), 4,4'-diphenylmethane diisocyanate (MDI), paraphenylenediisocyanate (PPDI), 1,5-naphthalene diisocyanate (NDI), 3,3'-dimethyldiphenyl-4,4'-diisocyanate (TODI), and multimers and modified products of these. Examples of the modified product of the isocyanate compound include a urethane prepolymer in which an isocyanate compound is prepolymerized together with a polyol.

The specific polymer is, for example, preferably a compound that reacts with an isocyanate compound and chemically bonds thereto. Examples of the acrylic polymer having a siloxane bond include a block copolymer of (meth)acrylic acid ester and (meth)acrylic acid siloxane ester and a derivative thereof. “(Meth)acryl” denotes any one or both of acryl and methacryl.

Examples of the acrylic polymer having a fluorine atom include a block copolymer of (meth)acrylic acid ester and fluorinated alkyl (meth)acrylate and a derivative thereof.

The cleaning blade preferably contains, for example, a polymer (silicone-based polymer) having a siloxane bond at a contact portion with the transfer opposing belt.

In addition, from the viewpoint of the solubility in an organic solvent, the specific polymer is, for example, preferably a compound containing a hydroxyl group, an alkyl group, or a carboxyl group.

Examples of a method of confirming that the specific polymer is contained in the surface layer of the contact portion of the cleaning blade and a method of confirming that the specific polymer which is an acrylic polymer is contained in the surface layer include the following methods. Specifically, the confirmation is made by estimating the structure and analyzing the composition of the surface layer material of the contact portion of the cleaning blade by an analysis method such as a Fourier transform infrared spectrophotometer (FTIR) or X-ray photoelectron spectroscopy (XPS).

The content of the specific polymer in the surface treatment liquid is, for example, 8 parts by mass or more and 13 parts by mass or less, and is preferably 9 parts by mass or more and 13 parts by mass or less and more preferably 10 parts by mass or more and 13 parts by mass or less with respect to 100 parts by mass of the isocyanate compound.

As the organic solvent, for example, an organic solvent that dissolves a specific polymer and is compatible with an isocyanate compound is preferable, and specific examples thereof include ethyl acetate, methyl ethyl ketone (MEK), toluene, acetone, and cyclohexanone. In addition, as the organic solvent, a reactive diluent such as 2-hydroxyethyl acrylate, tetrahydrofurfuryl acrylate, 2-hydroxyethyl methacrylate, hydroxypropyl methacrylate, glycidyl methacrylate, neopentyl glycol diacrylate, hexanediol diacrylate, or trimethylolpropane triacrylate may be used.

The modified layer is formed, for example, by impregnating and coating at least the contact portion of the cleaning blade with the surface treatment liquid described above, removing the organic solvent by drying, and forming the cured layer by heat treatment.

An impregnating and coating method is not particularly limited, and examples thereof include typical methods such as a blade coating method, a wire bar coating method, a spray coating method, a dip coating method, a bead coating method, an air knife coating method, and a curtain coating method. In a case where the impregnating and coating method is a dip coating method, the dipping time may be, for example, in a range of 10 seconds or longer and 60 seconds or shorter.

After the impregnation and coating, the surface treatment liquid may be dried, for example, under conditions of a temperature of 20° C. or higher and 30° C. or lower for 1 minute or longer and 10 minutes or shorter. The heat treatment may be performed, for example, under conditions of a temperature of 50° C. or higher and 80° C. or lower for 60 minutes or longer and 90 minutes or shorter.

Pressing Force

The pressing force NF (normal force) for pressing the cleaning blade against the transfer opposing belt is, for example, preferably 1.5 gf/mm or more and 3.5 gf/mm or less and more preferably 2.3 gf/mm or more and 3.2 gf/mm or less. In a case where the pressing force NF is 1.5 gf/mm or more, the occurrence of slip-through of the toner at a contact part of the cleaning blade with the transfer opposing belt is suppressed, and in a case where the pressing force NF is 3.5 gf/mm or less, the occurrence of toner filming on the surface of the transfer opposing belt is further suppressed.

The pressing force NF of the cleaning blade is calculated by the following formula.

$$\text{Pressing force } NF = k \times d \qquad \text{Formula}$$

Figure 3:
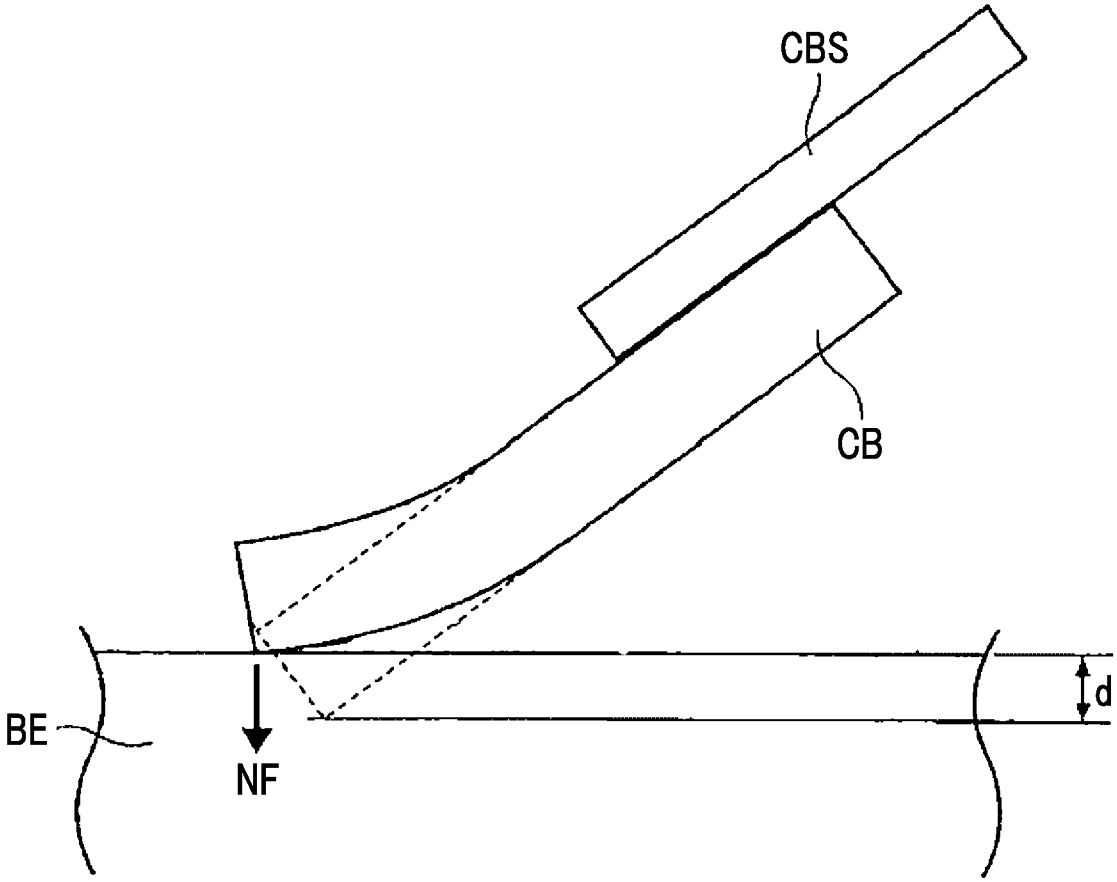
FIG. 3 is a schematic view for illustrating a pressing force to the transfer opposing belt of the cleaning blade.

In the formula, k represents a spring constant unique to the cleaning blade, and d represents an intrusion of the cleaning blade into the transfer opposing belt (see FIG. 3).

The spring constant k unique to the cleaning blade is obtained by causing displacement of a cleaning blade 12 and measuring the load with a load cell.

The intrusion d of the cleaning blade into the transfer opposing belt is determined by fixing the cleaning blade 12 to a support member and calculating the amount of displacement of the cleaning blade caused in a case where the cleaning blade is brought into contact with the transfer opposing belt.

In FIG. 3, BE represents the transfer opposing belt, CB represents the cleaning blade, and CBS represents the support member that supports the cleaning blade.

The intrusion d of the cleaning blade into the transfer opposing belt is, for example, preferably 0 mm or more and 10 mm or less, and more preferably 0.01 mm or more and 5 mm or less.

Transfer Opposing Belt

In the present exemplary embodiment, the transfer opposing belt disposed to come into contact with a surface of the recording medium on an opposite side to the surface to which the toner image is transferred has, for example, a conductive elastic layer (base material) containing a polymer material and conductive particles, and may further have a surface layer (protective layer) on at least one of the outer peripheral surface or the inner peripheral surface of the base material.

FIG. 1 is a perspective view schematically illustrating an example of the transfer opposing belt. The transfer opposing belt 50 illustrated in FIG. 1 has a base material (conductive elastic layer) 52, a protective layer (surface layer) 54, and a protective layer (surface layer) 56. The protective layer 54 is provided on the outer peripheral surface of the base material 52 and is a layer configuring the outer peripheral surface of the transfer opposing belt 50. The protective layer 56 is provided on the inner peripheral surface of the base material 52 and is a layer configuring the inner peripheral surface of the transfer opposing belt 50.

Hereinafter, the layer configuration and the material of the transfer opposing belt will be described in detail.

Base Material (Conductive Elastic Layer)

The base material is preferably, for example, a film or sheet in which conductive particles are contained in a polymer material.

As the polymer material, rubber or resin can be given as an example. As the polymer material, one kind may be used alone, or two or more kinds may be used in combination.

As the rubber, chloroprene rubber, epichlorohydrin rubber, isoprene rubber, butyl rubber, polyurethane, silicone rubber, fluororubber, styrene-butadiene rubber, butadiene rubber, nitrile rubber (NBR), ethylene propylene rubber, ethylene-propylene-diene ternary copolymer rubber (EPDM), natural rubber, or mixed rubber thereof can be given as an example.

Examples of the resin include polyamide, polyimide, polyamide imide, polyether imide, polyether ether ketone, polyphenylene sulfide, polyether sulfone, polyphenyl sulfone, polysulfone, polyethylene terephthalate, polybutylene terephthalate, polyacetal, polycarbonate, polyester, and a mixed resin thereof.

Examples of the conductive particles include carbon black such as Ketjen black, oil furnace black, channel black, or acetylene black; metal particles such as aluminum or nickel; and metal oxide particles such as indium tin oxide, tin oxide, zinc oxide, titanium oxide, or yttrium oxide. As the conductive particles, for example, carbon black is preferable. The conductive particles may be used alone or in combination of two or more kinds.

The average primary particle size of the conductive particles is, for example, preferably 1 nm or more and 150 nm or less, more preferably 3 nm or more and 100 nm or less, and still more preferably 5 nm or more and 50 nm or less.

The base material may include a conductive agent other than the conductive particles. Examples of the conductive agent include: an ion conductive material such as potassium titanate, potassium chloride, sodium perchlorate, or lithium perchlorate; and an ion conductive polymer such as polyaniline, polyether, polypyrrole, polysulfone, or polyacetylene. The conductive agent may be used alone or in combination of two or more kinds.

The base material is, for example, preferably a conductive elastic layer that contains rubber and conductive particles and more preferably a conductive elastic layer that contains at least one of chloroprene rubber or epichlorohydrin rubber, and carbon black.

The total content of the conductive particles and the conductive agent which are contained in the base material is set preferably, for example, based on the volume resistivity of the transfer opposing belt. The volume resistivity of the transfer opposing belt is, for example, preferably $1.0\times10^6$ Ω·cm or more and $1.0\times10^9$ Ω·cm or less.

In the present exemplary embodiment, the measurement of the volume resistivity (Q cm) is performed as follows.

A measurement environment is a temperature of 22° C. and a relative humidity of 55%. A sample is placed in the measurement environment for 24 hours or more and controlling temperature-humidity is performed. A resistance measuring machine is a microammeter (R8430A manufactured by Advantest Corp.), and a probe is a UR probe (manufactured by Mitsubishi Chemical Co., Ltd.). An applied voltage is 1 kV, an applied time is 5 seconds, and a load is 1 kgf. Measurement points are a total of 18 points of 6 points at equal intervals in the circumferential direction of the transfer opposing belt and 3 points of the central portion and both end portions in the width direction of the transfer opposing belt. The measured values of the 18 measurement points are arithmetically averaged.

In a case where the base material contains carbon black, the content of carbon black is preferably, for example, 5 parts by mass or more and 40 parts by mass or less with respect to 100 parts by mass of the polymer material.

The base material may include additives such as an antioxidant, a crosslinking agent, a flame retardant, a colorant, a surfactant, a dispersant, or a filler.

From the viewpoint of the durability of the transfer opposing belt, the average thickness of the base material is, for example, preferably 400 μm or more, more preferably 420 μm or more, and even more preferably 440 μm or more, and from the viewpoint of flexibility and bending resistance of the transfer opposing belt, the average thickness of the base material is, for example, preferably 800 μm or less, more preferably 600 μm or less, and even more preferably 500 μm or less.

Protective Layer (Surface Layer)

The transfer opposing belt may be provided with a protective layer on at least one of the outer peripheral surface or the inner peripheral surface of the base material, and the protective layers are preferably provided, for example, on the outer peripheral surface and the inner peripheral surface of the base material. The protective layer provided on the outer peripheral surface of the base material configures the outer peripheral surface of the transfer opposing belt. The protective layer provided on the inner peripheral surface of the base material configures the inner peripheral surface of the transfer opposing belt.

The protective layer is preferably, for example, a film or sheet containing a polymer material.

As the polymer material, the rubber or the resin described above regarding the base material can be given as an example.

The protective layer contains, for example, urethane resin and fluorine-containing resin particles.

The urethane resin (also referred to as polyurethane or urethane rubber) is generally synthesized by polymerizing polyisocyanate and polyol. The urethane resin preferably has, for example, a hard segment and a soft segment.

As the fluorine-containing resin particles, for example, one kind or two or more kinds of particles composed of any of ethylene tetrafluoride resin (polytetrafluoroethylene), ethylene trifluoride chloride resin, propylene hexafluoride resin, vinyl fluoride resin, vinylidene fluoride resin, ethylene difluoride dichloride resin, and copolymer thereof are preferable. Among these, as the fluorine-containing resin particles, for example, ethylene tetrafluoride resin (polytetrafluoroethylene) particles are preferable.

From the viewpoints of reducing friction at the contact portion with the cleaning blade and suppressing wear of the cleaning blade, the content of the fluorine-containing resin particles in the protective layer is, for example, preferably 35% by mass or more and more preferably 38% by mass or more. On the other hand, from the viewpoint of smoothness of the surface layer, the upper limit value of the content of the fluorine-containing resin particles in the protective layer is, for example, preferably 50% by mass or less and more preferably 45% by mass or less.

The protective layer preferably contains, for example, ethylene tetrafluoride resin (polytetrafluoroethylene) particles in an amount of 35% by mass or more, and the upper limit value of the content is preferably 50% by mass or less.

The average primary particle size of the fluorine-containing resin particles is, for example, preferably 5 nm or more and 300 nm or less, more preferably 8 nm or more and 200 nm or less, and even more preferably 10 nm or more and 150 nm or less.

The protective layer may contain an additive such as an antioxidant, a crosslinking agent, a flame retardant, a colorant, or a filler.

From the viewpoint of abrasion resistance of the protective layer, on one side of the base material, the average thickness of the protective layer is, for example, preferably 2 μm or more, more preferably 5 μm or more, and even more preferably 10 μm or more and from the viewpoint of flexibility and bending resistance of the transfer opposing belt, the average thickness of the protective layer is, for example, preferably 60 μm or less, more preferably 30 μm or less, and even more preferably 20 μm or less.

Manufacturing Method of Transfer Opposing Belt

As a method for manufacturing the transfer opposing belt, a manufacturing method in which a tubular member to be a base material is prepared and a protective layer is formed on the outer peripheral surface or the inner peripheral surface of the tubular member can be given as an example.

A manufacturing method of the tubular member is, for example, extrusion molding in which a composition containing a polymer material and conductive particles is melted and extruded from a dice into a belt shape and then solidified; injection molding in which a composition containing a polymer material and conductive particles is melted and put in a belt-shaped mold and then solidified; coating molding in which a composition containing a precursor or monomer of a polymer material and conductive particles is applied to a core body and solidified; or the like.

A forming method of the protective layer is, for example, applying a liquid composition containing a polymer material and fluorine-containing resin particles to the outer peripheral surface or the inner peripheral surface of the tubular member and solidifying the liquid composition; applying a liquid composition containing a precursor or a monomer of a polymer material and fluorine-containing resin particles to the outer peripheral surface or the inner peripheral surface of the tubular member and solidifying the liquid composition; or the like. In order to solidify the liquid composition, drying, heating, electron beam irradiation, or ultraviolet irradiation may be performed depending on the kinds of the components.

Configuration of Image Forming Apparatus

The image forming apparatus according to the present exemplary embodiment includes an image holder, a charging unit that charges the surface of the image holder, an electrostatic charge image forming unit that forms an electrostatic charge image on the charged surface of the image holder, a developing unit that accommodates an electrostatic charge image developer containing a toner having toner particles and that develops the electrostatic charge image formed on the surface of the image holder as a toner image by the electrostatic charge image developer, a transfer unit that transfers the toner image formed on the surface of the image holder to the surface of the recording medium and that has a transfer opposing belt which comes into contact with a surface (back surface) of the recording medium on an opposite side to a surface to which the toner image is transferred, and a cleaning device having a cleaning blade which is brought into contact with and cleans an outer peripheral surface of the transfer opposing belt.

As the image forming apparatus according to the present exemplary embodiment, known image forming apparatuses are applied which include an apparatus including transfer unit that transfers the toner image on the image holder onto the recording medium via the secondary transfer member (for example, secondary transfer belt); an apparatus including a fixing unit that fixes a toner image transferred to the surface of a recording medium; an apparatus including a cleaning device that cleans the surface of an image holder not yet being charged after transfer of a toner image; an apparatus including an electricity removing device that removes electricity by irradiating the surface of an image holder, the image holder not yet being charged, with electricity removing light after transfer of a toner image; an apparatus including an image holder heating member that raises the temperature of an image holder to reduce relative temperature, and the like.

The image forming apparatus according to the present exemplary embodiment may be any of a dry development type image forming apparatus or a wet development type (development type using a liquid developer) image forming apparatus.

In the image forming apparatus according to the present exemplary embodiment, for example, a portion including the image holder may be a cartridge structure (process cartridge) detachable from the image forming apparatus. As the process cartridge, for example, a process cartridge including a toner image forming device and a transfer device is preferably used.

Image Forming Method

An image forming method according to the present exemplary embodiment includes a charging step of charging a surface of an image holder, an electrostatic charge image forming step of forming an electrostatic charge image on the surface of the charged image holder, a developing step of developing the electrostatic charge image formed on the surface of the image holder as a toner image by the electrostatic charge image developer containing a toner having toner particles, a transfer step of bringing a transfer opposing belt which comes into contact with a surface of the recording medium on an opposite side to a surface to which the toner image is transferred and transferring the toner image formed on the surface of the image holder to the surface of the recording medium, and a cleaning step of bringing a cleaning blade into contact with an outer peripheral surface of the transfer opposing belt and cleaning the outer peripheral surface of the transfer opposing belt.

In the toner particles, the release agent present in a region within 800 nm from a surface of the toner particles is 70% or more of the release agent in the entire toner particles and a melting temperature of the release agent is 65° C. or higher and 80° C. or lower.

The cleaning blade is constituted of a polyurethane resin. The cleaning blade has an indentation elastic modulus of 15 MPa or more and 35 MPa or less on a surface which is brought into contact with the transfer opposing belt. Furthermore, in the cleaning blade, the total amount of F and Si present within 200 nm from the surface which is brought into contact with the transfer opposing belt accounts for 75% or more of a total amount of F and Si present within 5 μm from the surface.

Hereinafter, an example of the image forming apparatus and the image forming method according to the present exemplary embodiment will be described with reference to drawings. Here, the image forming apparatus and the image forming method according to the present exemplary embodiment are not limited thereto. Further, main parts shown in the figures will be described, but description of other parts will not be provided.

Figure 2:
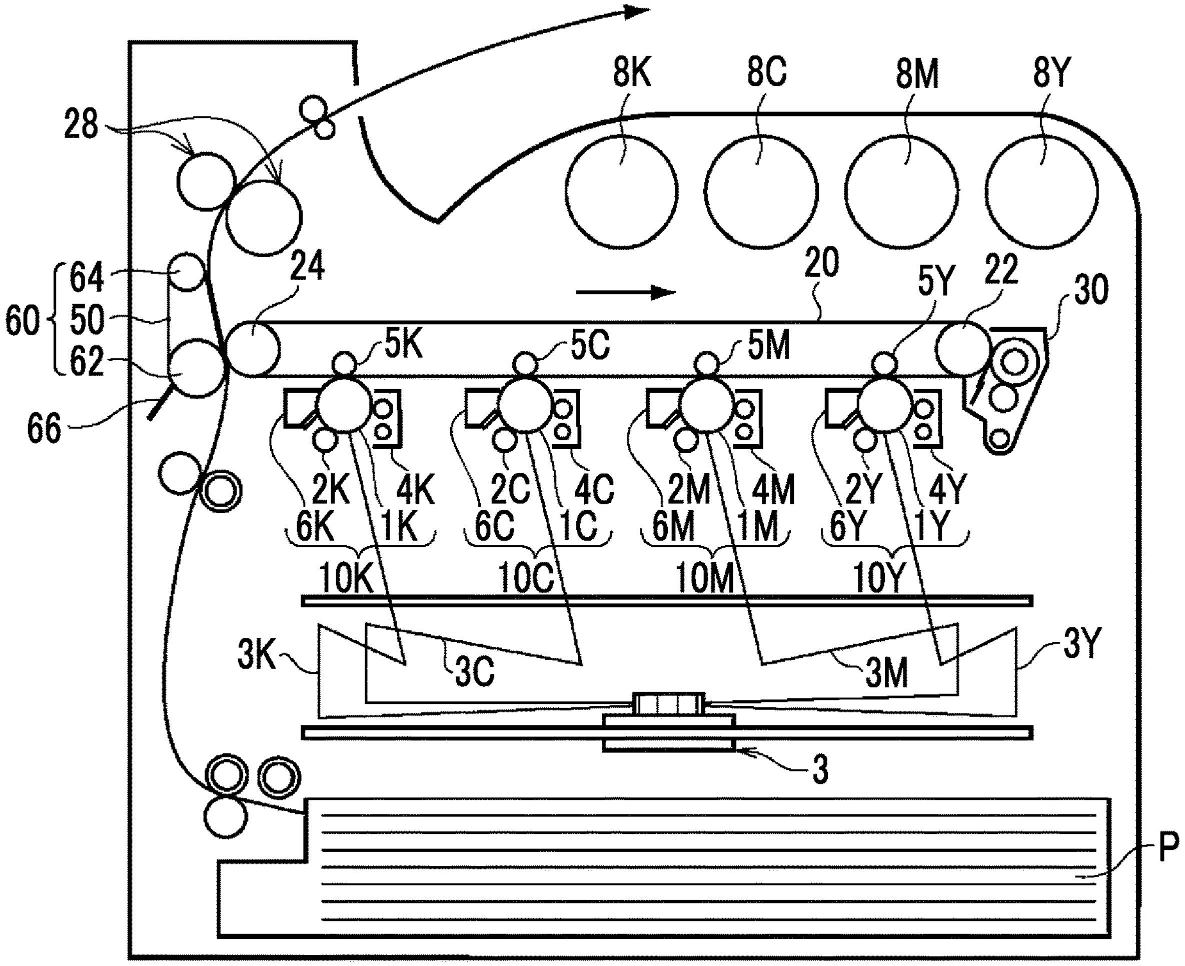
FIG. 2 is a schematic configuration view showing an example of an image forming apparatus according to the present exemplary embodiment.

FIG. 2 is a schematic configuration view showing an example of the image forming apparatus according to the present exemplary embodiment.

The image forming apparatus shown in FIG. 2 includes first to fourth image forming units 10Y, 10M, 10C, and 10K (image forming unit) adopting an electrophotographic method that output images of colors, yellow (Y), magenta (M), cyan (C), and black (K), based on color-separated image data. These image forming units (hereinafter, simply called "units" in some cases) 10Y, 10M, 10C, and 10K are arranged in a row in the horizontal direction in a state of being spaced apart by a predetermined distance. The units 10Y, 10M, 10C, and 10K may be process cartridges that are mounted to and demounted from the image forming apparatus.

An intermediate transfer belt (an example of the intermediate transfer member) 20 passing through above the units 10Y, 10M, 10C, and 10K extends under the units. The intermediate transfer belt 20 is looped around a driving roll 22 and a support roll 24, which are in contact with an inner surface of the intermediate transfer belt 20, and runs toward the fourth unit 10K from the first unit 10Y.

Force is applied to the support roll 24 in a direction away from the driving roll 22 by a spring or the like (not shown in the drawing). Tension is applied to the intermediate transfer belt 20 looped over the two rolls. An intermediate transfer belt cleaning device 30 facing the driving roll 22 is provided on an image holding surface side of the intermediate transfer belt 20.

Yellow, magenta, cyan, and black toners contained in containers of toner cartridges 8Y, 8M, 8C, and 8K are supplied to developing devices (developing units) 4Y, 4M, 4C, and 4K of the units 10Y, 10M, 10C, and 10K, respectively.

The first to fourth units 10Y, 10M, 10C, and 10K have the same configuration and operation. Therefore, in the present specification, as a representative, the first unit 10Y will be described which is placed on the upstream side of the running direction of the intermediate transfer belt and forms a yellow image.

The first unit 10Y includes a photoreceptor 1Y A charging roll (an example of a charging unit) 2Y that charges the surface of the photoreceptor 1Y to a potential determined in advance, an exposure device (an example of an electrostatic charge image forming unit) 3 that exposes the charged surface with a laser beam 3Y based on a color-separated image signal to form an electrostatic charge image, a developing device (an example of a developing unit) 4Y that develops the electrostatic charge image by supplying charged toner to the electrostatic charge image, a primary transfer roll (an example of a primary transfer unit) 5Y that transfers the developed toner image onto the intermediate transfer belt 20, and a photoreceptor cleaning device 6Y that removes the toner remaining on the surface of the photoreceptor 1Y after the primary transfer are disposed in order around the photoreceptor 1Y.

The primary transfer roll 5Y is disposed on the inner side of the intermediate transfer belt 20, at a position facing the photoreceptor 1Y. A bias power source (not shown in the drawing) for applying a primary transfer bias is connected to primary transfer rolls 5Y, 5M, 5C, and 5K of each unit.

The belt unit 60 is a belt unit including a transfer opposing belt 50. The belt unit 60 includes the transfer opposing belt 50, the driving roll 62, and the support roll 64.

The belt unit 60 is disposed outside the intermediate transfer belt 20 and is provided at a position facing the support roll 24. A bias power source (not shown) for applying a secondary transfer bias is connected to the belt unit 60.

In the transfer opposing belt 50 of the belt unit 60, the transfer opposing belt-cleaning blade 66 separable from the transfer opposing belt 50 is provided which removes the residual toner or paper powder on the transfer opposing belt 50 remaining after the secondary transfer and cleans the outer peripheral surface of the transfer opposing belt 50.

Hereinafter, the operation that the first unit 10Y carries out to form a yellow image will be described.

First, prior to the operation, the surface of the photoreceptor 1Y is charged to a potential of −600 V to −800 V by the charging roll 2Y.

The photoreceptor 1Y is formed of a photosensitive layer laminated on a conductive (for example, volume resistivity at 20° C.: $1\times10^{-6}$ Ω·cm or less) substrate. The photosensitive layer has properties in that although this layer usually has a high resistance (resistance of a general resin), in a case where the photosensitive layer is irradiated with the laser beam, the specific resistance of the portion irradiated with the laser beam changes. The surface of the charged photoreceptor 1Y is irradiated with the laser beam 3Y from the exposure device 3 according to the image data for yellow transmitted from the control unit not shown in the drawing. As a result, an electrostatic charge image of the yellow image pattern is formed on the surface of the photoreceptor 1Y.

The electrostatic charge image is an image formed on the surface of the photoreceptor 1Y by charging. This image is a so-called negative latent image formed in a manner in which the electric charges with which the surface of the photoreceptor 1Y is charged flow due to the reduction in the specific resistance of the portion of the photosensitive layer irradiated with the laser beam 3Y, but the electric charges in a portion not being irradiated with the laser beam 3Y remain.

The electrostatic charge image formed on the photoreceptor 1Y rotates to a predetermined development position as the photoreceptor 1Y runs. Then, at the development position, the electrostatic charge image on the photoreceptor 1Y is developed and visualized as a toner image by the developing device 4Y.

The developing device 4Y contains, for example, an electrostatic charge image developer that contains at least a yellow toner and a carrier. By being agitated in the developing device 4Y, the yellow toner undergoes triboelectrification, carries electric charges of the same polarity (negative polarity) as the electric charges with which the surface of the photoreceptor 1Y is charged, and is held on a developer roll (an example of a developer holder). As the surface of the photoreceptor 1Y passes through the developing device 4Y, the yellow toner electrostatically adheres to the electricity-removed latent image portion on the surface of the photoreceptor 1Y, and the latent image is developed by the yellow toner. The photoreceptor 1Y on which the yellow toner image is formed continuously runs at a speed determined in advance, and the developed toner image on the photoreceptor 1Y is transported to a primary transfer position determined in advance.

In a case where the yellow toner image on the photoreceptor 1Y is transported to the primary transfer position, a primary transfer bias is applied to the primary transfer roll 5Y, and an electrostatic force from the photoreceptor 1Y toward the primary transfer roll 5Y acts on the toner image, and the toner image on the photoreceptor 1Y is transferred onto the intermediate transfer belt 20. The transfer bias applied at this time has a polarity (+) opposite to the polarity (−) of the toner. In the first unit 10Y, the transfer bias is set, for example, to +10 μA under the control of the control unit (not shown in the drawing).

The primary transfer bias applied to the primary transfer rolls 5M, 5C, and 5K following the second unit 10M is also controlled according to the first unit.

In this way, the intermediate transfer belt 20 to which the yellow toner image is transferred in the first unit 10Y is sequentially transported through the second to fourth units 10M, 10C, and 10K, and the toner images of the respective colors are superimposed, and thus multiple transfer is performed.

The intermediate transfer belt 20 to which the toner images of four colors are multiple-transferred through the first to fourth units reaches a secondary transfer portion constituted of the intermediate transfer belt 20, the support roll 24, and the belt unit 60. On the other hand, recording paper (an example of the recording medium) P is fed to the gap where the belt unit 60 and the intermediate transfer belt 20 are in contact with each other via a supply mechanism at a timing determined in advance, and the secondary transfer bias is applied to the support roll 24. The transfer bias that is applied at this time has a (−) polarity that is the identical polarity to the toner polarity (−), and the electrostatic force from the intermediate transfer belt 20 toward the recording paper P acts on the toner image, and the toner image on the intermediate transfer belt 20 is transferred onto the recording paper P. The secondary transfer bias to be applied at this time is determined according to the resistance detected by a resistance detecting unit (not shown in the drawing) for detecting the resistance of the secondary transfer portion, and the voltage thereof is controlled.

The recording paper P with the toner image transferred thereto is sent to a pressure contact portion (nip portion) of a pair of fixing rolls of a fixing device (an example of a fixing unit) 28, the toner image is fixed to the recording paper P, and a fixed image is formed. The recording paper P on which the colored image has been fixed is transported to an output portion, and a series of colored image forming operations is finished.

As the recording paper P to which the toner image is transferred, plain paper that is used in electrophotographic copy machines, printers, or the like can be given as an example. Examples of the recording medium also include an OHP sheet, in addition to the recording paper P.

On the other hand, after the transfer to the recording paper P is finished, the residual toner remaining on the transfer opposing belt 50 is transported to the transfer opposing belt-cleaning blade 66 as the transfer opposing belt 50 rotates, and is removed from the transfer opposing belt 50 by the transfer opposing belt-cleaning blade 66.

Hitherto, the present exemplary embodiment has been described. However, the present exemplary embodiment is not limited to the above exemplary embodiments, and various modifications, changes, and ameliorations can be added thereto.

EXAMPLES

Examples of the present disclosure will be described below, but the present disclosure is not limited to the following examples. In the following description, all "parts" and "%" are in terms of mass unless otherwise specified.

Example 1

Preparation of Electrostatic Charge Image Developer

Preparation of Amorphous Polyester Resin Dispersion

Preparation of Polyester Resin Dispersion (APE1)

Terephthalic acid: 30 parts by mole

Fumaric acid: 70 parts by mole

Ethylene oxide adduct of bisphenol A: 5 parts by mole

Propylene oxide adduct of bisphenol A: 95 parts by mole

The above materials are put in a flask with an inner capacity of 5 liter equipped with a stirrer, a nitrogen introduction tube, a temperature sensor, and a rectifying column, the temperature is raised to 210° C. for an hour, and titanium tetraethoxide is added thereto in an amount of 1 part with respect to 100 parts of the above materials. While the generated water is being distilled off, the temperature is raised to 230° C. for 0.5 hours, a dehydration condensation reaction is continued for 1 hour at 230° C., and then the reactant is cooled. In this manner, a polyester resin having a weight-average molecular weight of 18,500, an acid value of 14 mgKOH/g, and a glass transition temperature of 59° C. is synthesized.

Ethyl acetate (40 parts) and 25 parts of 2-butanol are put in a container equipped with a temperature control unit and a nitrogen purge unit, thereby preparing a mixed solvent. Then, 100 parts of the polyester resin is slowly added to and dissolved in the solvent, a 10% by mass aqueous ammonia solution (in an amount equivalent to 3 times the acid value of the resin in terms of molar ratio) is added thereto, and the mixed solution is stirred for 30 minutes.

Thereafter, the container is cleaned out by dry nitrogen purging, and in a state where the mixed solution is being stirred at a temperature kept at 40° C., 400 parts of deionized water is added dropwise thereto at a rate of 2 parts/min such that the mixed solution is emulsified. After the dropwise addition ends, the temperature of the emulsion is returned to room temperature (20° C. to 25° C.), and bubbling is performed under stirring for 48 hours by using dry nitrogen, thereby obtaining a resin particle dispersion in which the concentration of ethyl acetate and 2-butanol is reduced to 1,000 ppm or less and the resin particles having the volume-average particle size of 200 nm is dispersed. Deionized water is added to the resin particle dispersion, and the solid content thereof is adjusted to 20% by mass, thereby obtaining a polyester resin particle dispersion (APE1).

Preparation of Colorant Particle Dispersion

Preparation of Colorant Particle Dispersion (Black Pigment Dispersion)

Carbon black (Regal 330, manufactured by Cabot Corporation): 250 parts

Anionic surfactant (NEOGEN SC, manufactured by DKS Co. Ltd.): 33 parts (60% of active ingredient, 8% with respect to colorant)

Deionized water: 750 parts 280 parts of deionized water and 33 parts of anionic surfactant are placed in a stainless steel container having a size such that the height of the liquid surface becomes about ⅓ of the height of the container in a case where all the above components are put therein. After the surfactant is sufficiently dissolved, all the solid solution pigments are added, and the mixture is stirred using a stirrer until the non-wet pigment disappears, and sufficiently defoamed. After defoaming, the remaining deionized water is added, and the mixture is dispersed at 5,000 rpm for 10 minutes using a homogenizer (T50 ULTRA-TURRAX manufactured by IKA), and then defoamed by stirring with a stirrer for 1 day and night. After defoaming, the mixture is dispersed again at 6,000 rpm for 10 minutes using the homogenizer, and then defoamed by stirring with a stirrer for 1 day and night. Subsequently, the dispersion is dispersed at a pressure of 240 MPa using a high-pressure impact disperser Ultimizer (HJP30006, manufactured by SUGINO MACHINE LIMITED CO., LTD.). Dispersion is performed corresponding to 25 passes in terms of the total charge amount and the processing capacity of the apparatus. The obtained dispersion is left to stand for 72 hours to remove a precipitate, and deionized water is added to adjust the solid content concentration to 15%, thereby obtaining a colorant particle dispersion. The volume-average particle size D50 of the particles in the colorant particle dispersion is 135 nm.

Preparation of Release Agent Dispersion

Preparation of Release Agent Dispersion (WAX1)

Paraffin-based wax (manufactured by NIPPON SEIRO CO., LTD., HNP9, melting temperature of 75° C.): 270 parts Anionic surfactant (manufactured by DKS Co. Ltd., NEOGEN RK, amount of active ingredient: 60%): 13.5 parts (as active ingredient, 3.0% with respect to release agent)

Deionized water: 21.6 parts

The above components are mixed, subjected to a dispersion treatment at a dispersion pressure of 5 MPa for 120 minutes and further at 40 MPa for 360 minutes with a pressure discharge type homogenizer (Gaulin homogenizer, manufactured by Gaulin) after a release agent is dissolved at an internal fluid temperature of 120° C., and cooled, thereby obtaining a release agent dispersion (WAX1). The volume-average particle size D50 of the particles in the release agent dispersion (WAX1) is 225 nm. Then, deionized water is added to adjust the solid content concentration to 20.0%.

Preparation of Mixed Particle Dispersion

Preparation of Mixed Particle Dispersion (RW1)

After mixing 150 parts of the polyester resin particle dispersion (APE1), 20 parts of the release agent particle dispersion (WAX1), and 2.9 parts of an anionic surfactant (Dowfax2A1 manufactured by The Dow Chemical Company), pH of the mixture is adjusted to 3.0 by adding 1.0% nitric acid under a temperature of 25° C., thereby obtaining the mixed particle dispersion (RW1).

Preparation of Toner

Polyester resin particle dispersion (APE1): 700 parts

Colorant particle dispersion: 133 parts

Deionized water: 400 parts

Anionic surfactant (Dowfax2A1 manufactured by The Dow Chemical Company): 2.9 parts The above components are placed in a 3 liter reaction container equipped with a thermometer, a pH meter, and a stirrer, and pH of the components is adjusted to 3.0 by adding 1.0% nitric acid at a temperature of 25° C. Then while dispersing at 5,000 rpm using a homogenizer (manufactured by IKA Japan: T50 ULTRA-TURRAX), 130 parts of the prepared aqueous aluminum sulfate solution is added and dispersed for 6 minutes.

Then, a stirrer and a mantle heater are installed in the reaction container, and while the rotation speed of the stirrer is adjusted such that the slurry is sufficiently stirred, the solution is heated at a temperature rising rate of 0.2° C./min up to a temperature of 40° C. and at a temperature rising rate of 0.05° C./min after exceeding 40° C., and the particle size is measured every 10 minutes with Multisizer II (aperture size: 50 μm, manufactured by Beckman Coulter Inc.). The reaction container is kept at the temperature at which the volume-average particle size has reached 5.0 μm, and 450 parts of the mixed particle dispersion (RW1) is added thereto for 5 minutes. After holding for 30 minutes, the pH is adjusted to 9.0 using a 1% aqueous sodium hydroxide solution. Then, the temperature is raised to 85° C. at a heating rate of 1° C./min and maintained while adjusting the pH to 9.0 at every 5° C. in the same manner. As a result of observing the shape and surface properties of the particles with an optical microscope and a scanning electron microscope (FE-SEM), the coalescence of the particles is confirmed after 5.0 hours. Therefore, the container is cooled to 30° C. for 5 minutes with cooling water.

The cooled slurry is allowed to pass through a nylon mesh having a mesh opening of m to remove coarse powder, and the toner slurry that has passed through the mesh is vacuum-filtered with an aspirator. The toner remaining on the filter paper is finely crushed by hand, added to deionized water in an amount of 10 times the toner at a temperature of 30° C., and the solution is mixed by being stirred for 30 minutes. Then, the solution is vacuum-filtered with an aspirator, the toner remaining on the filter paper is finely crushed by hand and added to deionized water in an amount of 10 times the toner at a temperature of 30° C., and the solution is mixed by being stirred for 30 minutes and vacuum-filtered with an aspirator again, and the electrical conductivity of the filtrate is measured. This operation is repeated until the electrical conductivity of the filtrate becomes 10 μS/cm or less, and the toner are washed. The washed toner is finely crushed with a wet dry granulator (Comil) and vacuum-dried in an oven at 35° C. for 36 hours, thereby obtaining toner particles.

Then, 3.3 parts of silica particles are added as an external additive to 100 parts of toner particles. Next, the mixture is mixed at a peripheral speed of 30 m/s for 3 minutes using a Henschel mixer. Then, the mixture is sieved using a vibration sieve having an opening size of 45 m, thereby obtaining a toner.

Production of Carrier 500 parts of spherical magnetite particle powder having a volume-average particle size of 0.18 μm is added to a Henschel mixer, and sufficiently stirred. Then, 5 parts of a titanate-based coupling agent is added, the temperature is raised to 95° C., and the mixture is mixed and stirred for 30 minutes. As a result, spherical magnetite particles coated with a titanate-based coupling agent are obtained.

Subsequently, 6 parts of phenol, 10 parts of 30% formalin, 500 parts of the magnetite particles, 7 parts of 25% ammonia water, and 400 parts of water are added to a 1 L four-neck flask and mixed and stirred. Next, the temperature is raised to 90° C. in 60 minutes with stirring, the reaction is carried out at the same temperature for 180 minutes, the temperature is cooled to 30° C., 500 ml of water is added, the supernatant is then removed, and the precipitate is washed with water. The precipitate is dried at 180° C. under reduced pressure, and coarse powder is removed by a sieving net having an opening of 106 μm to obtain core material particles having an average particle size of 38 μm.

Next, 200 parts of toluene and 35 parts of a styrene-methylmethacrylate copolymer (component molar ratio of 10:90, weight-average molecular weight of 160,000) are stirred for 90 minutes with a stirrer to obtain a coated resin solution.

1,000 parts of core material particles and 70 parts of a coated resin solution are placed in a vacuum degassing type kneader coater (clearance between rotor and wall surface of 35 mm), and the mixture is stirred at 30 rpm for 30 minutes while maintaining 65° C. Then, the temperature is set to 88° C., the pressure is reduced, and toluene distillation, degassing, and drying are performed. Next, the resultant is passed a mesh having an opening of 75 μm. The shape factor SF2 of the carrier is 104.

Production of Developer 8 parts of the toner and 100 parts of the carrier are mixed together by using a V blender, thereby producing a developer.

Toner Physical Properties

The ratio (surface layer ratio of the release agent) of the release agent present in the region within 800 nm from the surface of the toner particles to the release agent in the entire toner particles is measured by the above-mentioned method. In addition, the melting temperature of the release agent is measured by the above-mentioned method.

Production of Cleaning Blade 100 parts by mass of polycaprolactone polyol (molecular weight of 2000) as a high-molecular-weight polyol component reacts with 58 parts by mass of 4,4'-diphenylmethane diisocyanate (MDI: manufactured by DIC Corporation) as a polyisocyanate component at 115° C. for 20 minutes. Thereafter, 6.1 parts by mass of 1,4-butanediol and 2.6 parts by mass of trimethylolpropane as low-molecular-weight polyol components are mixed, and heated and cured in a mold maintained at 140° C. for 40 minutes. The mixture is molded, a rubber elastic member that is cut-processed into a shape with a width of 14 mm, a thickness of 1.9 mm, and a length of 330 mm is obtained, and this rubber elastic member adheres to a support plate, thereby obtaining a blade base material.

80 parts by mass of ethyl acetate as an organic solvent, 25 parts by mass of 4,4'-diphenylmethane diisocyanate (MDI: "MILLIONATE MT" manufactured by Tosoh Corporation, melting point: 38° C.) as an isocyanate compound, and 5 parts by mass of a silicone-modified acrylic polymer (8BS-9000, manufactured by Taisei Fine Chemical Co., Ltd.) as an acrylic polymer having a siloxane bond which is a specific polymer are dispersed and mixed with a ball mill for 5 hours, thereby obtaining a surface treatment liquid.

The blade base material is immersed in the surface treatment liquid for 60 seconds while the surface treatment liquid is maintained at 23° C., and dried in an environment of room temperature (25° C.) for 1 minute. Next, the surface of the dried blade base material is subjected to finish wiping with a sponge containing a small amount of toluene, further dried in an environment of 25° C. for 1 minute, and heated in an oven maintained at 25° C. for 50 minutes, thereby obtaining a cleaning blade.

Cleaning Blade Physical Properties

In the cleaning blade, a ratio (surface layer ratio of F and Si) of the total amount of F and Si present within 200 nm from the surface which is brought in contact with the transfer opposing belt to the total amount of F and Si present within 5 μm from the surface, the total amount of F and Si (amount of surface F and Si (atm %)) present on the surface which is brought in contact with the transfer opposing belt, and total amount of F and Si (amount of 50 nm position F and Si (atm %)) present at a position of 50 nm from the surface which is brought into contact with the transfer opposing belt are measured by the above-mentioned method.

Production of Transfer Opposing Belt

Production of Conductive Elastic Layer

A conductive rubber material containing carbon black in chloroprene rubber and ethylene propylene diene rubber are mixed. A mixture is extruded and molded by a kneading extruder, and dried with hot air to obtain a tubular body having a diameter (outer diameter) of 40 mm and an average thickness of 450 μm. The tubular body is cut to a length of 355 mm to obtain a base material (conductive elastic layer).

Production of Surface Layer

1% by mass of a curing agent (Loctite WH-1, Henkel Japan Ltd.) is added to a PTFE (polytetrafluoroethylene) particle-containing urethane resin (Bonderite T862A, Henkel Japan Ltd., content of PTFE: 65% by mass), the mixture is diluted with water to obtain a coating liquid.

The central axis of a base material is aligned in a horizontal direction, and the base material is rotated. In this state, the coating liquid is sprayed on the outer peripheral surface of the base material. Then, the base material is dried with hot air at a temperature of 150° C. for 35 minutes, thereby forming a surface layer having an average thickness of 10 μm on the outer peripheral surface of the base material. Next, the same coating liquid is also sprayed onto the inner peripheral surface of the base material, and hot air drying is performed in the same manner, thereby forming a surface layer having an average thickness of 10 μm on the inner peripheral surface of the base material.

In this way, a transfer opposing belt having surface layers on both surfaces of the base material (conductive elastic layer) is obtained.

Image Forming Apparatus

The electrostatic charge image developer, the transfer opposing belt (a belt which comes into contact with a surface of the recording medium on an opposite side to a surface to which the toner image is transferred), and the cleaning blade for the transfer opposing belt, which are obtained from the above, are applied to the image forming apparatus "Fujifilm Business Innovation Corp. Versant 3100i Press". As conditions for mounting the cleaning blade for a transfer opposing belt, a pressing force NF (Normal Force, gf/mm) is set to a condition shown in Table 1, and an angle W/A (Working Angle) is set to 10°.

Examples 2 to 12 and Comparative Examples 1 to 5

Preparation of Electrostatic Charge Image Developer

In Example 1, the release agent used for preparing the release agent dispersion is selected, and the amount of the mixed particle dispersion (RW1) at the time of preparing the toner is adjusted. Therefore, toner particles satisfying "the surface layer ratio (%) of the release agent" and "the melting temperature of the release agent (° C.)", which are described in Tables 1 and 2, are prepared, thereby obtaining an electrostatic charge image developer.

As the release agent having the melting temperature shown in Tables 1 and 2, the following agents are used, and the waxes are mixed alone or in any ratio to adjust the melting temperature to be targeted.

- Paraffin-based wax (manufactured by NIPPON SEIRO CO., LTD., melting temperature of 64° C.)
- Paraffin-based wax (HNP9 manufactured by NIPPON SEIRO CO., LTD., melting temperature of 75° C.)
- Ester-based wax (manufactured by NOF Corporation, melting temperature of 82° C.)
- Fischer-Tropsch wax (manufactured by NIPPON SEIRO CO., LTD., FNP-0090, melting temperature of 90° C.)

Production of Cleaning Blade

In Example 1, the amount of 4,4'-diphenylmethane diisocyanate (MDI: "MILLIONATE MT" manufactured by Tosoh Corporation, melting point: 38° C.) in forming the cleaning blade is adjusted. In addition, on the obtained blade base material, the composition of the surface treatment liquid used for the surface modification treatment for the contact portion and the conditions of the surface heat treatment are changed, and the cleaning blade satisfying the "surface layer ratio (%) of F and Si", "amount of surface F and Si (atm %)", "amount of 50 nm position F and Si (atm %)", and "100% modulus (MPa)", which are shown in Table 2, is produced.

In a case where the "silicone-based polymer" in Tables 1 and 2 is used as the surface treatment liquid, a treatment liquid in which ethyl acetate is mixed with 4,4'-diphenylmethane diisocyanate (MDI: "MILLIONATE MT" manufactured by Tosoh Corporation, melting point: 38° C.) as an isocyanate compound and a silicone-modified acrylic polymer (8BS-9000, manufactured by Taisei Fine Chemical Co., Ltd.) as an acrylic polymer having a siloxane bond is used. On the other hand, in a case where the "fluorine compound" in Tables 1 and 2 is used, a treatment liquid in which a fluorine-silicone-modified acrylic polymer (8FS-009; manufactured by Taisei Fine Chemical Co., Ltd.) is mixed in place of the silicone-modified acrylic polymer (8BS-9000) is used.

Production of Transfer Opposing Belt

In Example 1, the conductive particles used in the production of the base material (conductive elastic layer) are changed as shown in Tables 1 and 2, and a transfer opposing belt is obtained.

- Carbon black (manufactured by Mitsubishi Chemical Corporation, #3230B)
- Tin oxide (manufactured by Showa Kako Corp., stannous oxide)
- Zinc oxide (manufactured by Tayca Corporation, MZ-300)

Evaluation Test (1) Slip-Through

Using the image forming apparatus prepared in each Example and Comparative Example, after outputting 10,000 images in an environment of a temperature of 10° C. and a humidity of 20% RH, a blank image (that is, an image having an image density of 0%) is further output. The evaluation is performed according to the following criteria.

- G0: No streaks
- G1: 3 or less mild streaks that can be confirmed with a microscope (not visually confirmed).
- G2: More than 3 mild streaks that can be confirmed with a microscope (not visually confirmed)
- G3: 3 or less minor line streaks that can be visually confirmed.
- G4: More than 3 minor line streaks that can be visually confirmed
- G5: Clear line streaks occur (2) Filming Using the image forming apparatus prepared in each Example and Comparative Example, after outputting 1,000 images in an environment of a temperature of 28° C. and a humidity of 80% RH, 100 m square of the observed image of the surface of the transfer opposing belt is binarized, the ratio of the area occupied by the deposits is calculated, and evaluated according to the following criteria.

- G0: No deposits (adhesion ratio of 0%)
- G1: Slight adhesion (adhesion ratio of less than 1%)
- G2: Adhesion ratio of 1% or more and less than 3%
- G3: Adhesion ratio of 3% or more and less than 5%
- G4: Adhesion ratio of 5% or more and less than 10%
- G5: Adhesion ratio of 10% or more (3) Wear Using the image forming apparatus prepared in each Example and Comparative Example, after outputting 10,000 images in an environment of a temperature of 28° C. and a humidity of 80% RH, the wear depth of the cleaning blade is measured and evaluated according to the following criteria.

G0: No wear

G1: Minor wear (wear depth is more than 0 μm and less than 0.2 m)

G2: Wear depth of 0.2 μm or more and less than 0.4 μm

G3: Wear depth of 0.4 μm or more and less than 1.0 μm

G4: Wear depth is 1.0 μm or more and less than 2.0 μm

G5: Wear depth of 2.0 μm or more (4) Chipping

A transfer opposing belt having protrusions having a height of 5 μm and a width of 20 μm on an outer peripheral surface is prepared for an evaluation test of chipping. This transfer opposing belt is attached to the image forming apparatus prepared in each Example and Comparative Example, and after outputting 100 images in an environment of a temperature of 10° C. and a humidity of 20% RH, a chip depth of the cleaning blade at a position corresponding to the protrusion is measured and evaluated according to the following criteria.

G0: No chipping

G1: Minor chipping (chip depth is more than 0 μm and less than 1 μm)

G2: Chip depth is 1 μm or more and less than 2 μm

G3: Chip depth is 2 μm or more and less than 4 μm

G4: Chip depth is 4 μm or more and less than 6 μm

G5: Chip depth is 6 μm or more

TABLE 1

| | | Cleaning blade | | | | | |
|---|---|---|---|---|---|---|---|
| | | Indentation elastic modulus (MPa) | Blade treatment component | Surface layer ratio of F and Si (%) | Amount of surface F and Si (atm %) | Amount of 50 nm position F and Si(atm %) | Pressing force (gf/mm) |
| Example | 1 | 25 | Silicone-based polymer | 75 | 15 | 0.3 | 2.5 |
| | 2 | 25 | Silicone-based polymer | 75 | 15 | 0.3 | 2.5 |
| | 3 | 25 | Silicone-based polymer | 75 | 15 | 0.3 | 2.5 |
| | 4 | 15 | Silicone-based polymer | 75 | 15 | 0.3 | 2.5 |
| | 5 | 35 | Silicone-based polymer | 75 | 15 | 0.3 | 2.5 |
| | 6 | 15 | Silicone-based polymer | 95 | 20 | 0.3 | 2.5 |
| | 7 | 35 | Silicone-based polymer | 95 | 20 | 0.3 | 2.5 |
| | 8 | 25 | Silicone-based polymer | 75 | 15 | 0.3 | 2.5 |
| | 9 | 25 | Silicone-based polymer | 75 | 15 | 0.3 | 2.5 |
| | 10 | 25 | Fluorine compound | 75 | 15 | 0.3 | 2.5 |
| | 11 | 25 | Silicone-based polymer | 75 | 15 | 0.3 | 1.4 |
| | 12 | 25 | Silicone-based polymer | 75 | 15 | 0.3 | 3.6 |

| | | Toner | | Belt | Evaluation results | | | |
|---|---|---|---|---|---|---|---|---|
| | | Surface layer ratio of release agent (%) | Melting temperature of release agent (° C.) | Conductive powder | Slip-through | Filming | Wear | Chipping |
| Example | 1 | 70 | 75 | Carbon black | G1 | G1 | G1 | G1 |
| | 2 | 70 | 65 | Carbon black | G1 | G2 | G1 | G1 |
| | 3 | 70 | 80 | Carbon black | G1 | G1 | G1 | G1 |
| | 4 | 70 | 75 | Carbon black | G2 | G1 | G2 | G0 |
| | 5 | 70 | 75 | Carbon black | G0 | G2 | G1 | G0 |
| | 6 | 70 | 75 | Carbon black | G1 | G0 | G1 | G2 |
| | 7 | 70 | 75 | Carbon black | G0 | G2 | G0 | G2 |
| | 8 | 70 | 75 | Tin oxide | G2 | G2 | G1 | G1 |
| | 9 | 70 | 75 | Zinc oxide | G2 | G2 | G1 | G1 |
| | 10 | 70 | 75 | Carbon black | G1 | G1 | G1 | G1 |
| | 11 | 70 | 75 | Carbon black | G2 | G2 | G1 | G1 |

TABLE 1-continued

| | | | | | | | |
|---|---|---|---|---|---|---|---|
| 12 | 70 | 75 | Carbon black | G0 | G2 | G1 | G1 |

TABLE 2

| | | Cleaning blade | | | | | | |
|---|---|---|---|---|---|---|---|---|
| | | Indentation elastic modulus (MPa) | Blade treatment component | Surface layer ratio of F and Si (%) | Amount of surface F and Si (atm %) | Amount of 50 nm position F and Si (atm %) | Pressing force (gf/mm) | Toner Surface layer ratio of release agent (%) |
| Comparative Example | 1 | 37 | Silicone-based polymer | 74 | 13 | 0.6 | 2.5 | 70 |
| | 2 | 14 | Silicone-based polymer | 74 | 13 | 0.6 | 2.5 | 70 |
| | 3 | 25 | Silicone-based polymer | 75 | 15 | 0.3 | 2.5 | 70 |
| | 4 | 25 | Silicone-based polymer | 75 | 15 | 0.3 | 2.5 | 70 |
| | 5 | 25 | Silicone-based polymer | 75 | 15 | 0.3 | 2.5 | 65 |

| | | Toner Melting temperature of release agent (° C.) | Belt Conductive powder | Evaluation results Slip-through | Filming | Wear | Chipping |
|---|---|---|---|---|---|---|---|
| Comparative Example | 1 | 75 | Carbon black | G0 | G5 | G4 | G0 |
| | 2 | 75 | Carbon black | G4 | G1 | G5 | G0 |
| | 3 | 64 | Carbon black | G1 | G4 | G1 | G1 |
| | 4 | 82 | Carbon black | G4 | G2 | G1 | G1 |
| | 5 | 75 | Carbon black | G1 | G3 | G1 | G1 |

As shown in Tables 1 and 2, in the image forming apparatus of the present example, compared to the comparative examples, the occurrence of toner filming on the surface of the transfer opposing belt is suppressed and wear in the cleaning blade is suppressed.

The present exemplary embodiment includes the following aspects.

(((1)))

An image forming apparatus comprising, an image holder;

a charging unit that charges a surface of the image holder;

an electrostatic charge image forming unit that forms an electrostatic charge image on the charged surface of the image holder;

a developing unit that accommodates an electrostatic charge image developer containing a toner having toner particles and that develops an electrostatic charge image formed on the surface of the image holder as a toner image by the electrostatic charge image developer, in which a release agent present in a region within 800 nm from a surface of the toner particles is 70% or more of a release agent in entire toner particles and a melting temperature of the release agent is 65° C. or higher and 80° C. or lower;

a transfer unit that has a transfer opposing belt which comes into contact with a surface of a recording medium on an opposite side to a surface to which the toner image is transferred and that transfers the toner image formed on the surface of the image holder to the surface of the recording medium; and a cleaning device having a cleaning blade that is brought into contact with and cleans an outer peripheral surface of the transfer opposing belt, that is constituted of a polyurethane resin, and that has an indentation elastic modulus of 15 MPa or more and 35 MPa or less on a surface which is brought into contact with the transfer opposing belt, in which a total amount of F and Si present within 200 nm from the surface which is brought into contact with the transfer opposing belt accounts for 75% or more of a total amount of F and Si present within 5 m from the surface.

(((2)))

The image forming apparatus according to (((1))), wherein the release agent present in the region within 800 nm from the surface of the toner particles is 75% or more of the release agent of the entire toner particles.

(((3)))

The image forming apparatus according to (((1))) or (((2))), wherein the melting temperature of the release agent is 70° C. or higher and 75° C. or lower.

(((4)))

The image forming apparatus according to any one of (((1))) to (((3))), wherein the cleaning blade has the indentation elastic modulus of 20 MPa or more and 30 MPa or less.

(((5)))

The image forming apparatus according to any one of (((1))) to (((4))), wherein the total amount of F and Si present within 200 nm from the surface of the cleaning blade, which is brought into contact with the transfer opposing belt, accounts for 85% or more of the total amount of F and Si present within 5 μm from the surface.

(((6)))

The image forming apparatus according to any one of (((1))) to (((5))), wherein a total amount of F and Si present on the surface of the cleaning blade, which is brought into contact with the transfer opposing belt, is 15 atm % or more.

(((7)))

The image forming apparatus according to (((6))), wherein the total amount of F and Si present on the surface of the cleaning blade, which is brought into contact with the transfer opposing belt, is 18 atm % or more and 25 atm % or less.

(((8)))

The image forming apparatus according to any one of (((1))) to (((7))), wherein a total amount of F and Si present at a position of 50 nm from the surface of the cleaning blade, which is brought into contact with the transfer opposing belt, is 0.3 atm % or more.

(((9)))

The image forming apparatus according to (((8))), wherein the total amount of F and Si present at a position of 50 nm from the surface of the cleaning blade, which is brought into contact with the transfer opposing belt, is 0.3 atm % or more and 2.0 atm % or less.

(((10)))

The image forming apparatus according to any one of (((1))) to (((9))), wherein the cleaning blade contains a silicone-based polymer in a surface layer which is brought into contact with the transfer opposing belt.

(((11)))

The image forming apparatus according to any one of (((1))) to (((10))), wherein the cleaning blade is brought into contact with the transfer opposing belt with a pressing force of 1.5 gf/mm or more and 3.5 gf/mm or less.

(((12)))

The image forming apparatus according to any one of (((1))) to (((11))), wherein the transfer opposing belt has a conductive elastic layer containing carbon black and a surface layer containing polytetrafluoroethylene particles in an amount of 35% by mass or more.

(((13)))

An image forming method comprising:

charging a surface of an image holder;

forming an electrostatic charge image on the charged surface of the image holder;

developing an electrostatic charge image formed on the surface of the image holder as a toner image by an electrostatic charge image developer containing a toner having toner particles, in which a release agent present in a region within 800 nm from a surface of the toner particles is 70% or more of a release agent in entire toner particles and a melting temperature of the release agent is 65° C. or higher and 80° C. or lower;

bringing a transfer opposing belt into contact with a surface of a recording medium on an opposite side to a surface to which the toner image is transferred and transferring the toner image formed on the surface of the image holder to the surface of the recording medium; and bringing a cleaning blade into contact with an outer peripheral surface of the transfer opposing belt and cleaning the outer peripheral surface of the transfer opposing belt, the cleaning blade being constituted of a polyurethane resin and having an indentation elastic modulus of 15 MPa or more and 35 MPa or less on a surface which is brought into contact with the transfer opposing belt, in which a total amount of F and Si present within 200 nm from the surface which is brought into contact with the transfer opposing belt accounts for 75% or more of a total amount of F and Si present within 5 μm from the surface.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising, an image holder;

a charging unit that charges a surface of the image holder;

an electrostatic charge image forming unit that forms an electrostatic charge image on the charged surface of the image holder;

a developing unit that accommodates an electrostatic charge image developer containing a toner having toner particles and that develops an electrostatic charge image formed on the surface of the image holder as a toner image by the electrostatic charge image developer, in which a release agent present in a region within 800 nm from a surface of the toner particles is 70% or more of a release agent in entire toner particles and a melting temperature of the release agent is 65° C. or higher and 80° C. or lower;

a transfer unit that has a transfer opposing belt which comes into contact with a surface of a recording medium on an opposite side to a surface to which the toner image is transferred and that transfers the toner image formed on the surface of the image holder to the surface of the recording medium; and a cleaning device having a cleaning blade that is brought into contact with and cleans an outer peripheral surface of the transfer opposing belt, that is constituted of a polyurethane resin, and that has an indentation elastic modulus of 15 MPa or more and 35 MPa or less on a surface which is brought into contact with the transfer opposing belt, in which a total amount of F and Si present within 200 nm from the surface which is brought into contact with the transfer opposing belt accounts for 75% or more of a total amount of F and Si present within 5 μm from the surface.

2. The image forming apparatus according to claim 1, wherein the release agent present in the region within 800 nm from the surface of the toner particles is 75% or more of the release agent of the entire toner particles.

3. The image forming apparatus according to claim 1, wherein the melting temperature of the release agent is 70° C. or higher and 75° C. or lower.

4. The image forming apparatus according to claim 1, wherein the cleaning blade has the indentation elastic modulus of 20 MPa or more and 30 MPa or less.

5. The image forming apparatus according to claim 1, wherein the total amount of F and Si present within 200 nm from the surface of the cleaning blade, which is brought into contact with the transfer opposing belt, accounts for 85% or more of the total amount of F and Si present within 5 μm from the surface.

6. The image forming apparatus according to claim 1, wherein a total amount of F and Si present on the surface of the cleaning blade, which is brought into contact with the transfer opposing belt, is 15 atm % or more.

7. The image forming apparatus according to claim 6, wherein the total amount of F and Si present on the surface of the cleaning blade, which is brought into contact with the transfer opposing belt, is 18 atm % or more and 25 atm % or less.

8. The image forming apparatus according to claim 1, wherein a total amount of F and Si present at a position of 50 nm from the surface of the cleaning blade, which is brought into contact with the transfer opposing belt, is 0.3 atm % or more.

9. The image forming apparatus according to claim 8, wherein the total amount of F and Si present at the position of 50 nm from the surface of the cleaning blade, which is brought into contact with the transfer opposing belt, is 0.3 atm % or more and 2.0 atm % or less.

10. The image forming apparatus according to claim 1, wherein the cleaning blade contains a silicone-based polymer in a surface layer which is brought into contact with the transfer opposing belt.

11. The image forming apparatus according to claim 1, wherein the cleaning blade is brought into contact with the transfer opposing belt with a pressing force of 1.5 gf/mm or more and 3.5 gf/mm or less.

12. The image forming apparatus according to claim 1, wherein the transfer opposing belt has a conductive elastic layer containing carbon black and a surface layer containing polytetrafluoroethylene particles in an amount of 35% by mass or more.

13. An image forming method comprising:
charging a surface of an image holder;
forming an electrostatic charge image on the charged surface of the image holder;
developing an electrostatic charge image formed on the surface of the image holder as a toner image by an electrostatic charge image developer containing a toner having toner particles, in which a release agent present in a region within 800 nm from a surface of the toner particles is 70% or more of a release agent in entire toner particles and a melting temperature of the release agent is 65° C. or higher and 80° C. or lower;
bringing a transfer opposing belt into contact with a surface of a recording medium on an opposite side to a surface to which the toner image is transferred and transferring the toner image formed on the surface of the image holder to the surface of the recording medium; and
bringing a cleaning blade into contact with an outer peripheral surface of the transfer opposing belt and cleaning the outer peripheral surface of the transfer opposing belt, the cleaning blade being constituted of a polyurethane resin and having an indentation elastic modulus of 15 MPa or more and 35 MPa or less on a surface which is brought into contact with the transfer opposing belt, in which a total amount of F and Si present within 200 nm from the surface which is brought into contact with the transfer opposing belt accounts for 75% or more of a total amount of F and Si present within 5 μm from the surface.

14. An image forming apparatus comprising,
an image holder;
charging means for charging a surface of the image holder;
electrostatic charge image forming means for forming an electrostatic charge image on the charged surface of the image holder;
developing means for accommodating an electrostatic charge image developer containing a toner having toner particles and for developing an electrostatic charge image formed on the surface of the image holder as a toner image by the electrostatic charge image developer, in which a release agent present in a region within 800 nm from a surface of the toner particles is 70% or more of a release agent in entire toner particles and a melting temperature of the release agent is 65° C. or higher and 80° C. or lower;
transfer means with a transfer opposing belt which comes into contact with a surface of a recording medium on an opposite side to a surface to which the toner image is transferred, for transferring the toner image formed on the surface of the image holder to the surface of the recording medium; and
a cleaning device having a cleaning blade that is brought into contact with and cleans an outer peripheral surface of the transfer opposing belt, that is constituted of a polyurethane resin, and that has an indentation elastic modulus of 15 MPa or more and 35 MPa or less on a surface which is brought into contact with the transfer opposing belt, in which a total amount of F and Si present within 200 nm from the surface which is brought into contact with the transfer opposing belt accounts for 75% or more of a total amount of F and Si present within 5 μm from the surface.

* * * * *